(12) United States Patent
Malm

(10) Patent No.: US 7,353,135 B2
(45) Date of Patent: Apr. 1, 2008

(54) POSITIONING AND ALIGNING THE PARTS OF AN ASSEMBLY

(76) Inventor: Robert Malm, 16624 Pequeno Pl., Pacific Palisades, CA (US) 90272

(*) Notice: Subject to any disclaimer, the term of this patent is extended or adjusted under 35 U.S.C. 154(b) by 267 days.

(21) Appl. No.: 11/308,101

(22) Filed: Mar. 7, 2006

(65) Prior Publication Data
US 2007/0213852 A1    Sep. 13, 2007

(51) Int. Cl.
*G01C 9/00* (2006.01)
*G01C 17/00* (2006.01)
*G01C 19/00* (2006.01)
*G06F 15/00* (2006.01)
*G06F 19/00* (2006.01)
*G05B 19/18* (2006.01)
*G05B 11/32* (2006.01)

(52) U.S. Cl. .................. 702/153; 702/151; 700/57; 700/62; 700/63; 700/69; 700/188

(58) Field of Classification Search ............ 700/56, 700/57, 61–63, 69, 186, 188, 302; 702/142, 702/145, 150–153; 701/116; 318/560
See application file for complete search history.

(56) References Cited

U.S. PATENT DOCUMENTS

| | | | |
|---|---|---|---|
| 6,434,437 B1* | 8/2002 | Brandt et al. | 700/69 |
| 6,480,760 B1* | 11/2002 | Doi | 700/245 |
| 6,584,378 B1* | 6/2003 | Anfindsen | 700/245 |
| 6,609,315 B1* | 8/2003 | Hendron et al. | 37/348 |
| 6,658,365 B2* | 12/2003 | Kodaira | 702/142 |
| 6,744,511 B1* | 6/2004 | Saiki et al. | 356/399 |
| 6,915,230 B2* | 7/2005 | Kawai et al. | 702/139 |
| 7,062,334 B2* | 6/2006 | Tanaka et al. | 700/69 |
| 7,233,389 B2* | 6/2007 | Rastegar et al. | 356/28 |
| 2007/0073439 A1* | 3/2007 | Habibi et al. | 700/213 |

* cited by examiner

*Primary Examiner*—Crystal J. Barnes
(74) *Attorney, Agent, or Firm*—Robert E Malm

(57) ABSTRACT

The invention is an apparatus and process for obtaining values for one or more alignment quantities using one or more transportable devices. The process consists of establishing and maintaining a transportable device in a reference position and a reference orientation, then establishing and maintaining the transportable device in a fixed position and orientation with respect to a target object, then determining the transportable object's position and orientation with respect to the target object from measurements of acceleration and angular velocity of the transportable device as it moves from the reference position and orientation to the fixed position and orientation with respect to the target object, determining the position and orientation of the target object from the position and orientation of the transportable device, repeating the preceding steps as required to obtain position and orientation data for other target objects, and finally determining the values of the alignment quantities.

20 Claims, 27 Drawing Sheets

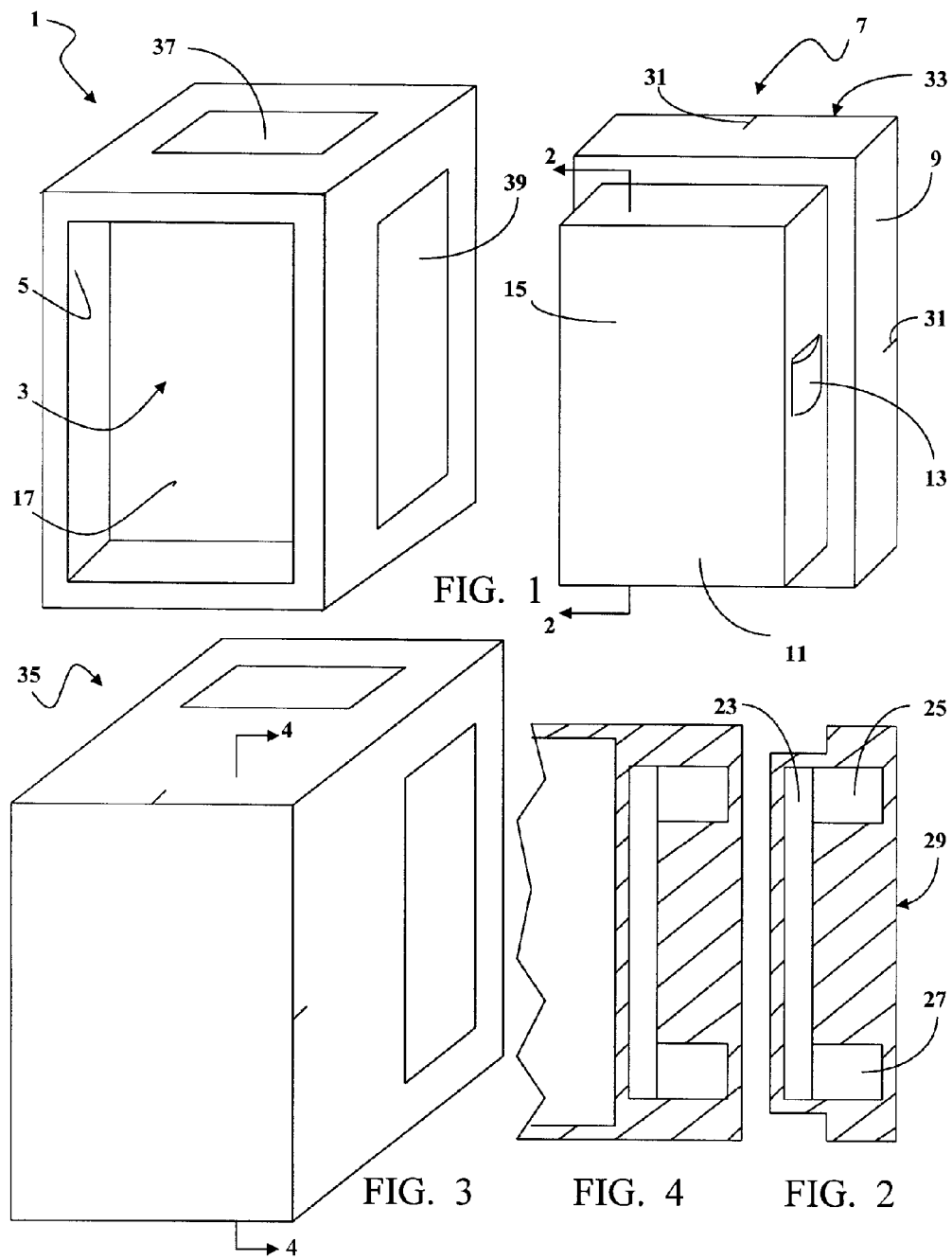

a step for designating a transportable device and then establishing and maintaining the designated transportable device in a reference position and a reference orientation, the step being executed for each of the one or more transportable devices. — 11 a step for establishing and then maintaining a designated transportable device in one of a class of positions and in one of a class of orientations with respect to a designated target object, the class of positions and the class of orientations each including one or more members, the step being executed for each of the one or more transportable devices with respect to one or more target objects. — 12 a step for determining the maintained position coordinates and the maintained orientation coordinates of a transportable device when the transportable device is being maintained in a fixed position and orientation with respect to a target object from measurements of acceleration and angular velocity of the transportable device as it moves from a reference position to the fixed position and as it rotates from a reference orientation to the fixed orientation, the step being executed for each of one or more transportable devices and with respect to one or more target objects for each transportable device. — 13 a step for determining one or more of the position coordinates and/or one or more of the orientation coordinates of a target object from the maintained position coordinates and the maintained orientation coordinates of a transportable device when the transportable device is in a maintained position and a maintained orientation with respect to the target object, the step being executed for each of one or more transportable devices and with respect to one or more target objects for each transportable device. — 14 a step for determining the values of one or more alignment quantities utilizing one or more position coordinates and/or one or more orientation coordinates of one or more target objects. — 15

FIG. 8

| a step for holding the designated transportable device in one of the class of positions and in one of the class of orientations with respect to the designated target object. | | |
|---|---|---|
| the designated transportable device being held in position and orientation, in whole or in part, by forces applied to the designated transportable device, directly or indirectly, by the designated target object. | 12.14.11 | 12.14 |
| the designated transportable device being held in position and orientation, in whole or in part, by frictional forces. | 12.14.21 | |
| the designated transportable device being held in position and orientation, in whole or in part, by forces exerted by interlocking features of the designated transportable device or an attached device and the designated target object. | 12.14.31 | |
| the designated transportable device being held in position and orientation, in whole or in part, by magnetic forces. | 12.14.41 | |
| the designated transportable device being held in position and orientation, in whole or in part, by gravity. | 12.14.51 | |
| the designated transportable device being held in position and orientation, in whole or in part, by one of the collaborating entities. | 12.14.61 | |

| a step for reporting that the designated transportable device is being maintained in one of a class of positions and in one of a class of orientations with respect to the designated target object. | | |
|---|---|---|
| the reporting being initiated by one of the collaborating entities. | 12.15.11 | 12.15 |
| the reporting being initiated by sensing the absence of movement of the designated transportable device. | 12.15.21 | |
| the reporting being initiated by sensing that the designated transportable device is in a position and orientation that are included respectively in the class of positions and the class of orientations. | 12.15.31 | |

FIG. 10C

| a step for obtaining the identities of the one or more target objects whose one or more position coordinates and/or one or more orientation coordinates are required to determine the values of the one or more alignment quantities. |
|---|

| a step for retrieving the identities of one or more of the one or more target objects from a memory. | 15.13.11 |

| a step for transmitting a request for the identities of one or more of the one or more target objects. | 15.13.21 |

| a step for receiving the identities of one or more of the one or more target objects in response to a request. | 15.13.22 |

| a step for identifying the target objects that are referenced in the one or more equations which define the one or more alignment quantities. | 15.13.31 |

15.13

| a step for obtaining one or more of the position coordinates and/or one or more of the orientation coordinates of a designated target object utilizing a designated transportable device, the step being executed for each of the one or more target objects that are utilized in determining the values of the one or more alignment quantities. |
|---|

| a step for determining the identity of the designated transportable device to be placed in a reference position and a reference orientation. | 15.14.11 |

| a step for determining the identity of the designated transportable device to be placed in a position and an orientation with respect to the designated target object. | 15.14.12 |

| a step for determining the identity of the designated target object. | 15.14.13 |

| a step for receiving notification that the one or more position coordinates and/or the one or more orientation coordinates of the target object are available. | 15.14.14 |

15.14

FIG. 13B a p&o determining means for determining the values of maintained position coordinates and maintained orientation coordinates of the p&o determining means when the p&o determining means is being maintained in a fixed position and a fixed orientation with respect to a target object, the values of the maintained position coordinates and the maintained orientation coordinates being determined from measurements of acceleration and angular velocity by the p&o determining means as it moves from a reference position to the fixed position and as it rotates from a reference orientation to the fixed orientation, the fixed position being one of a class of positions and the fixed orientation being one of a class of orientations fixed with respect to a target object, the p&o determining means being associated with an individual coordinate system fixed with respect to the p&o determining means, the position of the p&o determining means being defined as the origin of the associated coordinate system, the orientation of the p&o determining means being defined as the orientation of the associated coordinate system. — 21 a t-o computing means for computing the values of one or more of the position coordinates and/or one or more of the orientation coordinates of one or more target objects from the maintained position coordinate values and the maintained orientation coordinate values of the p&o determining means with respect to the one or more target objects. — 22 an a-q computing means for determining the values of one or more alignment quantities utilizing one or more position coordinates and/or one or more orientation coordinates of one or more target objects. — 23 a c&c means for exercising overall command and control over the collaborating entities by causing data and/or commands to be communicated among the collaborating entities. — 24

FIG. 14

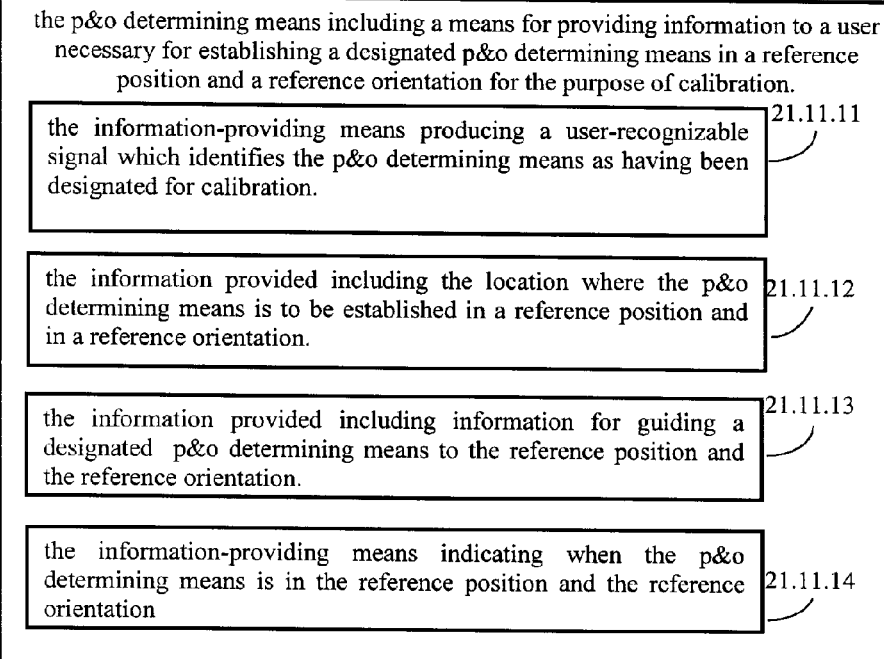
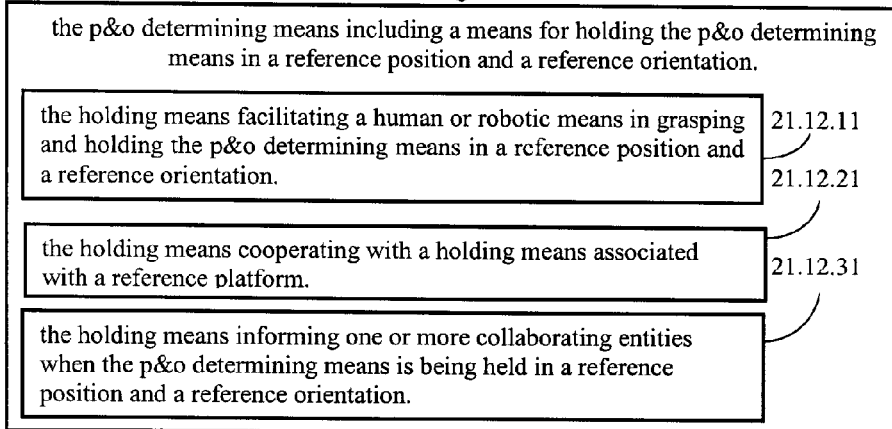
FIG. 15A

> the p&o determining means including a means for holding the p&o determining means in a fixed position and a fixed orientation with respect to a target object.
>
>> the holding means causing the p&o determining means to be held in position and orientation, in whole or in part, by forces applied to the p&o determining means, directly or indirectly, by the designated target object. — 21.14.11
>>
>> the holding means causing the p&o determining means to be held in position and orientation, in whole or in part, by frictional forces applied either to the p&o determining means or to an adapter attached to the p&o determining means. — 21.14.21
>>
>> the holding means causing the p&o determining means to be held in position and orientation, in whole or in part, by forces exerted by interlocking features of the p&o determining means or an adapter attached to the p&o determining means and the target object. — 21.14.31
>>
>> the holding means causing the p&o determining means to be held in position and orientation, in whole or in part, by magnetic forces applied either to the p&o determining means or to an adapter attached to the p&o determining means. — 21.14.41
>>
>> the holding means causing the p&o determining means to be held in position and orientation, in whole or in part, by gravity. — 21.14.51
>>
>> the holding means causing the p&o determining means to be held in position and orientation, in whole or in part, by human or robotic means acting either directly or through an adapter attached to the p&o determining means. — 21.14.61

21.14

> the p&o determining means including a means for obtaining information necessary for the determination of the position and orientation of a target object
>
>> the information including that the p&o determining means is presently in the reference position and the reference orientation. — 21.15.11
>>
>> the information including the reference position coordinates and the reference orientation coordinates of the p&o determining means. — 21.15.12
>>
>> the information including that the p&o determining means is in a maintained position and a maintained orientation with respect to the target object. — 21.15.13

21.15

FIG. 15C

```
┌─────────────────────────────────────────────────────────────────────┐
│  the t-o computing means including a means for obtaining the position coordinates
│         and the orientation coordinates of the p&o determining means.
│   ┌──────────────────────────────────────────────────┐
│   │ when the p&o determining means is in a maintained position │ 22.11.11
│   │ and a maintained orientation with respect to the target object. │
│   └──────────────────────────────────────────────────┘
│                                                           22.11.21    22.11
│   ┌──────────────────────────────────────────────────┐
│   │ the t-o computing means including a means for requesting the │
│   │ position coordinates and the orientation coordinates of the p&o │
│   │ determining means from a collaborating entity. │
│   └──────────────────────────────────────────────────┘
│                                                           22.11.22
│   ┌──────────────────────────────────────────────────┐
│   │ the t-o computing means including a means for receiving the │
│   │ position coordinates and the orientation coordinates of the p&o │
│   │ determining means in response to a request. │
│   └──────────────────────────────────────────────────┘
└─────────────────────────────────────────────────────────────────────┘
```

```
┌─────────────────────────────────────────────────────────────────────┐
│  the t-o computing means including a means for obtaining transformation data that
│      define the one or more position coordinates and/or the one or more orientation
│         coordinates of the target object coordinate system with respect to the p&o
│      determining means coordinate system when the p&o determining means is being
│         maintained in a fixed position and orientation with respect to the target object.
│                                                           22.12.11
│   ┌──────────────────────────────────────────────────┐              22.12
│   │ the transformation data being obtained from memory. │
│   └──────────────────────────────────────────────────┘
│                                                           22.12.21
│   ┌──────────────────────────────────────────────────┐
│   │ the t-o computing means including a means for requesting the │
│   │ transformation data from a collaborating entity. │
│   └──────────────────────────────────────────────────┘
│                                                           22.12.22
│   ┌──────────────────────────────────────────────────┐
│   │ the t-o computing means including a means for receiving the │
│   │ transformation data in response to a request. │
│   └──────────────────────────────────────────────────┘
└─────────────────────────────────────────────────────────────────────┘
```

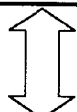

FIG. 16A the a-q computing means including a means for obtaining the identities of the one or more alignment quantities for which values are to be determined.

the a-q computing means including a means for requesting the identities of the one or more alignment quantities from a collaborating entity. 23.11.11

23.11 the a-q computing means including a means for receiving the identities of the one or more alignment quantities in response to a request. 22.11.12

the a-q computing means including a means for obtaining one or more equations which define the values of the one or more alignment quantities in terms of one or more position coordinates and/or one or more orientation coordinates of the one or more target objects.

the a-q computing means including a means for retrieving one or more of the one or more equations from a memory. 23.12.11

23.12 the a-q computing means including a means for requesting one or more of the one or more equations. 23.12.21 the a-q computing means including a means for receiving one or more of the one or more equations in response to a request. 23.12.22

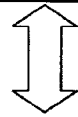

FIG. 17A

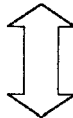

the a-q computing means including a means for obtaining the identities of the one or more target objects whose one or more position coordinates and/or one or more orientation coordinates are required to determine the values of the one or more alignment quantities.

the a-q computing means including a means for retrieving the identities of one or more of the one or more target objects from a memory. — 23.13.11

23.13 the a-q computing means including a means for requesting the identities of one or more of the one or more target objects from other collaborating entities. — 23.13.21 the a-q computing means including a means for receiving the identities of one or more of the one or more target objects in response to a request. — 23.13.22 the a-q computing means including a means for identifying the target objects that are referenced in the one or more equations which define the one or more alignment quantities. — 23.13.31

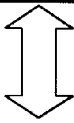

FIG. 17B

POSITIONING AND ALIGNING THE PARTS OF AN ASSEMBLY

CROSS-REFERENCE TO RELATED APPLICATIONS (Not Applicable)

STATEMENT REGARDING FEDERALLY SPONSORED RESEARCH AND DEVELOPMENT (Not Applicable)

STATEMENT REGARDING FEDERALLY SPONSORED RESEARCH OR DEVELOPMENT (Not Applicable)

THE NAMES OF THE PARTIES TO A JOINT RESEARCH AGREEMENT (Not Applicable)

INCORPORATION-BY-REFERENCE OF MATERIAL SUBMITTED ON A COMPACT DISC (Not Applicable)

BACKGROUND OF THE INVENTION

This invention relates generally to the positioning and alignment of parts in assemblies of parts and more specifically to the use of inertial navigation techniques in such activities. The types of assemblies for which this invention is most suited are those involving interacting and/or interdependent parts which must be positioned and oriented relative to each other in order for the assembly to work properly and where the relative position and orientation of parts is difficult to determine efficiently with acceptable precision using conventional techniques.

An example of an "assembly of parts" for which this invention is particularly suitable is the automobile which will be used in illustrating how the this invention can be used in the positioning and orientation of parts in the manufacturing stage and also in the maintenance of the vehicle during its lifetime.

A vehicle typically consists of a body, chassis, and the components that facilitate the mobility of the vehicle. The chassis provides a strong, rigid platform which supports the body, the drive train, the wheels, and the suspension components. A typical chassis design involves a structural arrangement of interconnected steel beams. In the beginning, vehicle bodies were bolted to the chassis. The more modern approach has been to integrate the body with the frame by welding with the advantage of achieving greater strength and rigidity of the vehicle while at the same time reducing the strength and rigidity demands on the chassis.

A vehicle requires the precise assembly of a large number of individual components which may require the use of specialized jigs and fixtures and precise measuring systems in the assembly process. For those components that can move out of alignment with respect to the chassis, there must be ways of measuring the out-of-alignment condition and making appropriate adjustments.

Wheel alignment is the condition wherein the orientations of the wheels with respect to the chassis are such as to result in proper vehicle handling and minimal tire wear. Wheels can get out of alignment as a result of (1) wear of the steering and suspension components, (2) bent or damaged steering and suspension components, or (3) sagging springs that result in changes in the alignment angles of the wheels.

The orientation of a wheel is referenced to three axes fixed with respect to the chassis of the vehicle. A "longitudinal chassis axis" is an axis that points in the intended direction of motion of a vehicle when the vehicle is moving along a straight line. A "transverse chassis axis" is an axis that is normal to a longitudinal chassis axis and parallel to the surface which supports the vehicle. A "normal chassis axis" is an axis normal to both a longitudinal chassis axis and a transverse chassis axis.

A "chassis plane" is a plane containing a transverse chassis axis and a longitudinal chassis axis. A "transverse normal plane" is a plane containing a transverse chassis axis and a normal chassis axis. A "longitudinal normal plane" is a plane containing a longitudinal chassis axis and a normal chassis axis.

The "steering axis" is defined as the line drawn through the upper and lower steering pivot points. In the case of a short/long arm (SLA) type suspension system, the upper pivot is the upper ball joint and the lower pivot is the lower ball joint. In the case of a MacPherson strut system, the upper pivot is the center of the upper bearing mount and the lower pivot is the lower ball joint.

The "longitudinal steering-axis plane" is the plane containing the steering axis and a longitudinal axis. The angle between the longitudinal steering-axis plane and a longitudinal normal plane is the "steering axis inclination" (SAI), also known as the "king pin inclination" (KPI). The SAI is positive if the upper end of the steering axis tilts toward the chassis.

The "transverse steering-axis plane" is the plane containing the steering axis and a transverse axis. The angle between the transverse steering-axis plane and a transverse normal plane is called the "caster", the caster being negative if the upper suspension pivot point is closer to the front of the vehicle than the lower suspension pivot point and positive if the reverse is true.

The "longitudinal wheel-axis plane" is the plane containing the wheel axis and a longitudinal axis. The angle between the longitudinal wheel-axis plane (with the wheels pointed straight ahead) and a chassis plane is called the "camber", the camber being positive if the top of the wheel is tilted away from the chassis and negative if it is tilted toward the chassis. The sum of the camber and the SAI is called the "included angle".

The "transverse wheel-axis plane" is the plane containing the wheel axis and a normal axis. The angle (in radians) between the transverse wheel-axis plane (with the wheels pointed straight ahead) and a transverse normal plane is called the "toe angle", the toe angle being positive if the front of the tire is tilted toward the chassis and negative if it is tilted away from the chassis.

The "turning radius", also called "toe-out on turns" (TOT or TOOT), is the angle between the transverse wheel-axis planes for the front wheels when the front wheels are placed in a full-turn position.

The angle between the normal to the front axle line, the line connecting the front axles, and a longitudinal axis is called the "setback". Positive setback results when the right front wheel is set back farther than the left. Negative setback results when the situation is reversed.

The point of intersection of the steering axis and the ground is specified by the "offset" and the "caster trail". The "offset" is the distance between the point of intersection and the intersection of the central wheel plane and the ground. The "caster trail" is the distance between the point of intersection and the transverse normal plane through the center of the wheel.

The "thrust angle" is the angle of the rear wheel planes with respect to a longitudinal chassis axis.

The most frequent alignment procedure performed is the alignment of the front wheels of the vehicle. The front wheels are attached to the chassis via a number of linkages that permit the wheels to move up and down as the vehicle moves over the ground and to be pointed in a particular steering direction.

The position and orientation of a wheel is conveniently defined by a Cartesian coordinate system fixed with respect to the wheel. The origin of the coordinate system is the intersection of the rotational axis of the wheel and the central plane of the wheel. Two of the axes are in the central plane of the wheel and the third coincides with the axis of rotation of the wheel. The position of a wheel is identified with the origin of the wheel coordinate system. The orientation of the wheel is defined as the orientation of the wheel coordinate system.

The front wheel alignment quantities can be determined by measuring the wheel position and orientation at three turning angles, e.g. −20 degrees, 0 degrees (wheel pointed straight ahead), and +20 degrees while maintaining the upper and lower steering pivot points at fixed positions. The three wheel positions are on a circle concentric with the steering axis. The steering axis corresponds to the line normal to the plane of the circle that passes through the center of the circle. The steering axis inclination is obtained by calculating the angle between a normal chassis axis and the projection of the steering axis on a transverse normal chassis plane. The castor is obtained by calculating the angle between a normal chassis axis and the projection of the steering axis on a longitudinal normal chassis plane. The offset is obtained by calculating the distance between the point of intersection of the steering axis and the driving surface and the line of intersection of the central wheel plane with the driving surface. The castor trail is obtained by calculating the distance between the point of intersection of the steering axis and the driving surface and the line of intersection of the transverse normal chassis plane that contains the wheel axis center point and the driving surface.

The measurement of wheel orientation when the wheel is pointed straight ahead (0 degrees turning angle) provides the data necessary to determine the camber and toe angles. The camber is obtained by calculating the angle between a transverse chassis axis and the projection of the wheel axis onto a transverse normal chassis plane. The toe angle is obtained by calculating the angle between a transverse chassis axis and the projection of the wheel axis onto a longitudinal chassis plane.

The measurement of wheel orientations when the wheels are turned to specified angles provides the data necessary to determine turning radius. The procedure is essentially the same as that for determining toe angles.

BRIEF SUMMARY OF THE INVENTION

The invention is a process and apparatus for obtaining values for one or more alignment quantities using one or more transportable devices. The values for the entirety of alignment quantities are denoted as alignment data which include the three position coordinate values and the three orientation coordinate values of one or more target objects and data derivable from the coordinate values.

The term "target object" refers to either an assembly part or any other object involved in obtaining alignment data. Each transportable device or target object is associated with an individual coordinate system fixed with respect to the transportable device or target object. The position of a transportable device or target object is defined as the origin of the associated coordinate system, and the orientation of a transportable device or a target object is defined as the orientation of the associated coordinate system. Positions and orientations are expressed in terms of coordinate values in a common frame of reference.

The process is accomplished in five steps. Step (a) results in designating a transportable device and then establishing and maintaining the designated transportable device in a reference position and a reference orientation. The step is executed for each of the one or more transportable devices.

Step (b) results in establishing and then maintaining a designated transportable device in one of a class of positions and in one of a class of orientations with respect to a designated target object, the class of positions and the class of orientations each including one or more members. The step is executed for each of the one or more transportable devices with respect to one or more target objects.

Step (c) results in determining the maintained position coordinates and the maintained orientation coordinates of a transportable device when the transportable device is being maintained in a fixed position and orientation with respect to a target object from measurements of acceleration and angular velocity of the transportable device as it moves from a reference position to the fixed position and as it rotates from a reference orientation to the fixed orientation. The step is executed for each of one or more transportable devices and with respect to one or more target objects for each transportable device.

Step (d) results in determining one or more of the position coordinates and/or one or more of the orientation coordinates of a target object from the maintained position coordinates and the maintained orientation coordinates of a transportable device when the transportable device is in a maintained position and a maintained orientation with respect to the target object. The step is executed for each of one or more transportable devices and with respect to one or more target objects for each transportable device.

Step (e) results in determining the values of one or more alignment quantities utilizing one or more position coordinates and/or one or more orientation coordinates of one or more target objects.

BRIEF DESCRIPTION OF THE SEVERAL VIEWS OF THE DRAWINGS

FIG. 1 shows a case and an adapter for a transportable device.

FIG. 2 shows a cross-sectional view of the adapter of FIG. 1.

FIG. 3 shows a case for a transportable device intended to interface directly with a target object.

FIG. 4 shows a cross-sectional view of a portion of the case of FIG. 3.

FIG. 8 shows the step-plus-functions to be performed by a user and/or supporting apparatus in positioning and aligning the parts of an assembly.

FIG. 14 shows the means-plus-functions to be utilized in positioning and aligning the parts of an assembly.

DETAILED DESCRIPTION OF THE INVENTION

Figure 5:
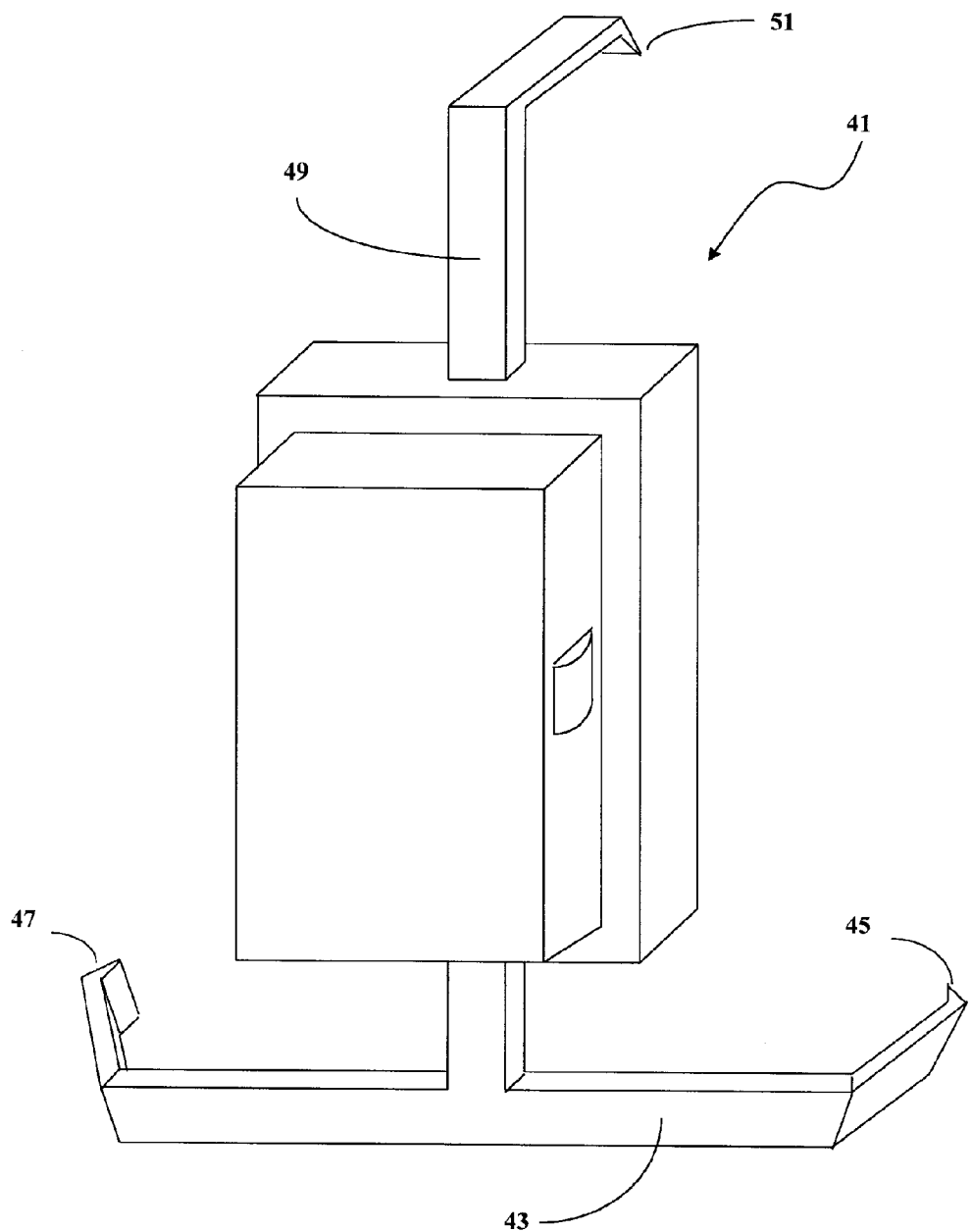
FIG. 5 shows an adapter for the case of FIG. 1 suitable for vehicle wheel alignment.

The invention is a process and apparatus for obtaining values for one or more alignment quantities using one or more transportable devices, the values for the entirety of alignment quantities being denoted as alignment data which includes the three position coordinate values and the three orientation coordinate values of one or more target objects and data derivable from the position coordinate values and orientation coordinate values of one or more target objects. The term "target object" may refer to either a part of an assembly or any other object involved in obtaining alignment data (e.g. the surface upon which the assembly rests).

Each transportable device or target object is associated with an individual coordinate system fixed with respect to the transportable device or target object. The position of a transportable device or target object is defined as the origin of the associated coordinate system. The orientation of a transportable device or a target object is defined as the orientation of the associated coordinate system. Positions and orientations are expressed in terms of coordinate values in a common frame of reference.

The function performed by a process step or an apparatus means is executed by one or more function entities. A plurality of functions may be executed by a single function entity. A function entity may be a human being or an apparatus.

The conceptual basis of the invention is a transportable device, the position and orientation of which is redetermined at regular intervals of time from measurements of acceleration and angular velocity. In the embodiment of the invention described herein, the position and orientation of the transportable device is determined with reference to a tangent-plane coordinate system. A tangent-plane coordinate system is a coordinate system wherein the x-y plane is tangent to the geodetic reference ellipsoid with the x axis pointing to true north and the z axis is normal to the reference ellipsoid surface and points to the interior of the ellipsoid.

A transportable device is calibrated by placing it in a reference position and orientation, the coordinates of which in the tangent-plane coordinate system are either known or can be determined. A convenient way of accomplishing this step is by placing the transportable device on a reference platform in a prescribed position and orientation relative to the reference platform. A preferred embodiment of the reference platform is a reference cradle designed to hold a transportable device securely in a fixed position and orientation relative to the reference cradle. In some situations, where numerous transportable devices are being used, it may be desirable to have several reference cradles available.

By maintaining a transportable device in a known position and orientation relative to a target object, the position and orientation of the target object can be determined from the position and orientation of the transportable device. By repeating this process for one or more properly-chosen target objects, assembly alignment data can be obtained.

The positions and orientations of a transportable device, as it is moved from one target object to another, is conveniently obtained by using well-known inertial navigation techniques whereby the present position and orientation of the transportable device is determined from the prior position and orientation of the transportable device and measurements of its acceleration and angular velocity. Inertial navigation techniques and analysis are described in numerous textbooks, articles, papers, and patents including Anthony Lawrence, *Modern Inertial Technology, Navigation, Guidance, and Control*, Second Edition, Springer-Velag New York, Inc., New York, N.Y. (1998), Jay A. Farrell & Matthew Barth, *The Global Positioning System & Inertial Navigation*, McGraw-Hill, New York, N.Y. (1999), and Paul G. Savage, *Strapdown Analytics*, Strapdown Associates, Inc., Maple Plain, Minn. (2000).

A transportable device, in its simplest form, consists of a case and an inertial navigator mounted within the case. The inertial navigator provides the measuring and computing resources necessary for the continuous determination of the position and orientation of the case and command, control, and communication resources necessary for the execution of alignment procedures. The case is equipped with attachment devices and alignment features that facilitate maintaining the case (and the inertial navigator) in a desired position and orientation relative to one or more target objects.

One can avoid the difficulties of designing a case that can be readily attached to and detached from any of the variety of target objects of interest by providing a multiplicity of adapters which are attachable to a case of a particular design, each adapter being attachable to a particular type of target object. In this way one can economically accommodate any type of target object by providing a suitable adapter.

A case and mating adapters can be configured in a variety of ways. One configuration is shown in FIG. 1. Case 1 has a rectangular recess 3 in the front surface with a rim 5 dimensioned to accept a class of adapters exemplified by adapter 7. Adapter 7 consists of a faceplate 9 and a protrusion 11 dimensioned to enter recess 3. Adapter 7 is attached to case 1 by aligning protrusion 11 with rim 5 and then applying pressure to faceplate 9. As protrusion 11 slides into recess 3, spring-loaded protuberance 13 and a similar protuberance from the bottom of protrusion 11 are depressed thereby allowing protrusion 11 to slide fully into recess 3 and allowing adapter surface 15 to make contact with case surface 17. As protrusion 11 fully enters recess 3, the frictional forces existing between rim 5 and protuberance 13 and the bottom protuberance hold case 1 and adapter 7 firmly together. The forces exerted by the protuberances against rim 5 causes case 1 and adapter 7 to be closely aligned after protrusion 11 enters recess 3 and butts against case surface 17. Thus, the insertion of adapter 7 into case 1 results in the precise alignment of adapter 7 to case 1 in position and orientation.

A cross-sectional view of adapter 7 is shown in FIG. 2. Adapter 7 is envisioned as being constructed of a plastic material in which are embedded a magnet 23 and pole pieces 25 and 27 which are made of soft iron or some other material having a small magnetic reluctance. When adapter surface 29 is brought into contact with a steel target object, the presence of the magnet 23 and pole pieces 25 and 27 within adapter 7 results in adapter 7 (and case 1 when attached to adapter 7) being held immobile against the target object by the magnetic forces established between adapter 7 and the target object. Thus, adapter 7 is suitable for maintaining a transportable device in a fixed position and orientation relative to target objects made of iron, steel, or other magnetic materials.

It may be necessary in certain circumstances to place adapter 7 on a surface of a target object in a specific orientation with respect to the normal to the surface. For this purpose alignment marks 31 are provided. A possible alignment procedure might be to align the edge 33 with an alignment line on the target object surface and to align the alignment mark 31 with an alignment mark on the target object surface that crosses the target object alignment line.

Case 35 shown in FIG. 3 is an embodiment that interfaces directly with a target object. Case 35 is essentially case 1 to which adapter 7 is permanently attached as evident from the cross-sectional view of FIG. 4.

Cases 1 and 35 each include one or more input/output panels 37, 39 incorporated in the case surfaces. Command/control panel 37 may include one or more of a variety of means for inputting commands and thereby controlling the operations of the electronics within case embodiments 1 and 35. The input means may be tactile consisting of a few buttons for entering discrete commands or a full alphanumeric keyboard for entering data. The input means can be a microphone for receiving voice commands and data. The input means can be a jack into which a plug connected to a multiconductor cable or an optical fiber can be inserted for the direct input of electrical signals or light beams. The input means can be an antenna for receiving electromagnetic waves.

The input means provided by command/control panel 37 may be accompanied by status-indicating visual, audible, or tactile means in support of the exercise of a means for entering commands and/or data. For example, an activated green-light source might indicate a state of readiness to accept input commands.

Communication panel 39 may provide the means for requesting data inputs and providing information relating to the operations being performed within case embodiments 1 and 35. A variety of formats may be used in requesting and providing data including synthesized speech utilizing a loudspeaker in the panel and visual data displayed on the panel. The output data may also be supplied as electrical signals and transmitted to remote locations via conducting wires, optical fibers, and sound or electromagnetic waves launched by transducers and/or antennas. The same communication panel that is primarily intended for outputting data may also include means for inputting data and commands associated with the outputting function.

An adapter 41 suitable for vehicle wheel alignment is shown in FIG. 5. The magnet 23 and pole pieces 25, 27 of adapter 7 are replaced by fixed arm 43 and spring-loaded arm 49. Adapter 41 is attached to a wheel rim by first hooking wedges 45, 47 on the lower portion of the wheel rim. Then spring-loaded arm 49 is extended against the force of a spring until wedge 51 can be hooked over the top of the wheel rim.

Figure 6:
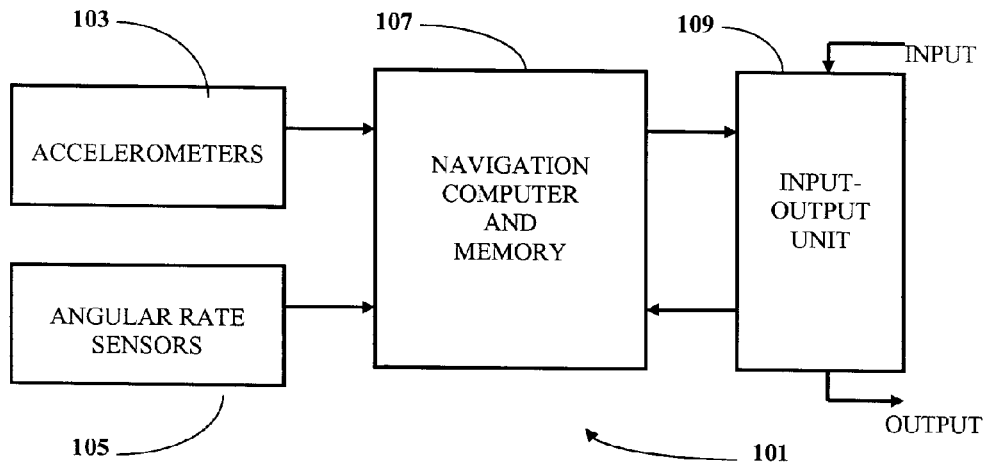
FIG. 6 shows a functional block diagram for an inertial navigator.

A functional block diagram for an inertial navigator is shown in FIG. 6. The inertial navigator 101 consists of three accelerometers 103, three angular-rate sensors 105, a navigation computer and memory 107, and an input/output unit 109. The axes of maximum sensitivity of accelerometers 103 and angular-rate sensors 105 are aligned with the orthogonal axes of the Cartesian coordinate system associated with the transportable device. The navigation computer and memory 107 utilizes periodic inputs from the accelerometers 103 and angular-rate sensors 105 to determine the orientation, position, and velocity of the transportable device and also provides the means for storing data that is of particular interest in obtaining alignment data and monitoring the operation of the inertial navigator.

The input/output unit 109 provides the interface between the transportable device, the user of the device, and any equipments that may be associated with the transportable device in obtaining alignment data. The input and output lines denote the communications, whatever the form they may take, that the inertial navigator 101 receives from or delivers to a user or equipments. The incoming communications may include speech by a user issuing voice commands, electrical signals arriving over conducting wires, light signals arriving over optical fibers, sound waves, and electromagnetic waves. Similarly, the outgoing communications may include synthesized speech intended for a user's ears, visually-communicated information intended for a user's eyes, tactile information detectable by a user's sense of touch, and information transmitted by wave propagation and detectable by antennas and/or transducers of various types.

Figure 7:
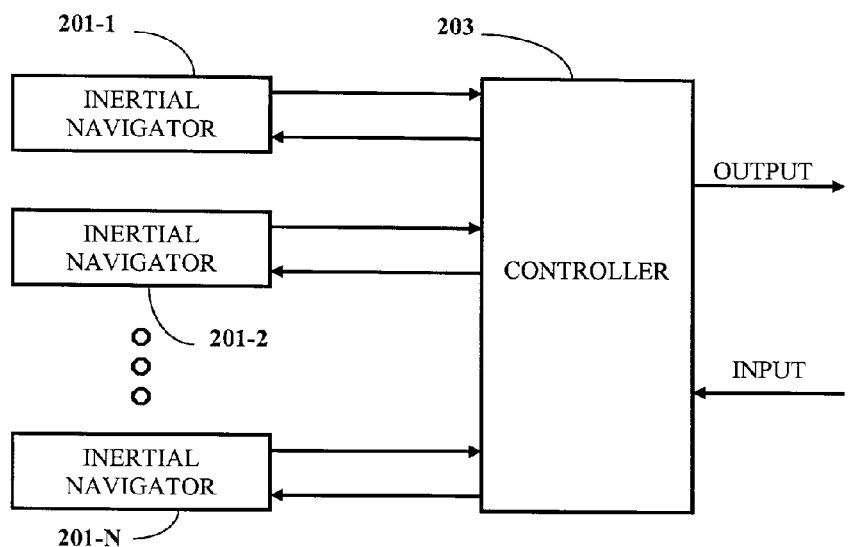
FIG. 7 shows a parts positioning and alignment system consisting of a plurality of inertial navigators and a controller 203.

A parts positioning and alignment system consisting of inertial navigators 201-1, 201-2, . . . , 201-N and controller 203 is shown in FIG. 7. Control of the inertial navigators and the human involvement in obtaining alignment data is exercised by the controller 203 under the overall supervision of a user. Just like an inertial navigator, the input and output lines denote the communications, whatever the form they may take, that the controller 203 receives from or delivers to a user or other equipments. The incoming communications may include speech by a user issuing voice commands, electrical signals arriving over conducting wires, light signals arriving over optical fibers, sound waves, and electromagnetic waves. Similarly, the outgoing communications may include synthesized speech intended for a user's ears, visually-communicated information intended for a user's eyes, tactile information detectable by a user's sense of touch, and information transmitted by wave propagation and detectable by transducers of various types.

Inertial navigators 201-1, 201-2, . . . , 201-N and controller 203 would be packaged separately in the typical embodiment of the present invention. The simplest embodiment of the parts alignment system would utilize a single inertial navigator packaged together with the controller thereby permitting communication between the units to be accomplished by printed circuit wiring or the equivalent.

The step-plus-functions to be performed by one or more entities in positioning and aligning the parts of an assembly are detailed in FIG. 8.

Step-plus-function 11 specifies a step for designating a transportable device and then establishing and maintaining the designated transportable device in a reference position and a reference orientation, the step being executed for each of the one or more transportable devices.

Typically, the means for aiding the execution of the function would be embodied in the designs of the transportable device and a reference platform (if such a platform were used) whereby the transportable device and the reference platform could be brought together in a unique and precise fashion. For example, adapter 7 of FIG. 1 could function as a reference platform for a transportable device packaged in case 1. The interlocking features of case 1 and adapter 7 would enable a user to attach the case (transportable device) to the adapter (reference platform) in a precise and unambiguous manner so that the desired result of step-plus-function 11 is achieved.

The use of a reference platform is an attractive way of establishing a transportable device in a known starting position and a known starting orientation. However, the use of a reference platform is not essential. A user could simply place the transportable device on a bench and let the transportable device self-determine its position and orientation, thereby establishing its reference position and reference orientation for use in determining its future positions and orientations as it is moved about.

Step-plus-function 11 provides for the calibration of the tools for positioning and aligning parts in an assembly in that it results in the transportable device being established and maintained in a reference position and reference orientation, the coordinates of which being either known or determinable. Knowledge of the coordinates of the reference position and reference orientation (which corresponds to the starting position and orientation of the transportable device) is key to executing the other functions required in positioning and aligning parts in an assembly.

Step-plus-function 12 specifies a step for establishing and then maintaining a designated transportable device in one of a class of positions and in one of a class of orientations with respect to a designated target object, the class of positions and the class of orientations each including one or more members, the step being executed for each of the one or more transportable devices with respect to one or more target objects.

The means for aiding the execution of this function is most conveniently embodied in the design of an adapter for temporarily attaching the transportable device to the target object of immediate interest. For example, the incorporation of a magnetic holding device in case 35 (FIG. 3) of a transportable device or in adapter 7 (FIG. 1) enables a user to temporarily attach the transportable device to a target object made of steel.

In contrast to Step-plus-function 11 and the enabling of the establishment and maintenance of a transportable device in a reference position and a reference orientation (which may be facilitated by the use of a reference platform), Step-plus-function 12 results in the establishment and maintenance of a transportable device in one of a class of positions and in one of a class of orientations with respect to a target object. The reason for utilizing class specifications is that it is sometimes unnecessary to establish a transportable device in a unique position and/or a unique orientation relative to a target object.

For example, in determining the alignment of the wheels of a vehicle, one is interested in the orientation of the wheel plane relative to the chassis axes. Adapter 41 shown in FIG. 5 enables a user to attach a transportable device to a wheel rim in any one of a class of positions corresponding to the points on a circle concentric with the rotational axis of the wheel and in a particular orientation, dependent on the position of the transportable device, which is a member of the class of orientations that are achievable by rotating the transportable device about the rotational axis of the wheel.

Alignment quantities are typically defined with reference to a "supporting surface"—the surface which supports the assembly. If the supporting surface is planar, its orientation can be determined by placing the transportable device anywhere on the surface. The prescribed class of positions includes any position on the supporting surface. The prescribed class of orientations includes any orientation that can be obtained by rotation of the transportable object about an axis normal to the supporting surface.

Step-plus-function 13 specifies a step for determining the maintained position coordinates and the maintained orientation coordinates of a transportable device when the transportable device is being maintained in a fixed position and orientation with respect to a target object from measurements of acceleration and angular velocity of the transportable device as it moves from a reference position to the fixed position and as it rotates from a reference orientation to the fixed orientation, the step being executed for each of one or more transportable devices and with respect to one or more target objects for each transportable device.

Step-plus-function 14 specifies a step for determining one or more of the position coordinates and/or one or more of the orientation coordinates of a target object from the maintained position coordinates and the maintained orientation coordinates of a transportable device when the transportable device is in a maintained position and a maintained orientation with respect to the target object, the step being executed for each of one or more transportable devices and with respect to one or more target objects for each transportable device.

Step-plus-function 15 specifies a step for determining the values of one or more alignment quantities utilizing one or more position coordinates and/or one or more orientation coordinates of one or more target objects.

The step-plus-function elements are linked by two-headed arrows which are intended to indicate that the functions are not necessarily performed in order from top to bottom each time the parts of an assembly are positioned and/or aligned. For example, in accomplishing a wheel alignment, step-plus-functions 11-15 might be executed in sequence followed by a wheel alignment adjustment based on the results of step-plus-function 15, and Step-plus-functions 13-15 might then be repeatedly executed until the correct alignment is achieved.

To execute the positioning and aligning process, the step-executing entities may be one or more human beings or various apparatuses. The entity which exercises supervisory control over and supplies needed information to other collaborating entities would in most instances be a human being but could be a machine. A human being may be the entity that establishes and then maintains a designated transportable device in a prescribed reference position and a prescribed reference orientation with respect to a reference platform. A human being may also be the entity that establishes and then maintains a designated transportable device in one of a class of prescribed positions and in one of a class of prescribed orientations with respect to a target object. However, these two tasks might instead be performed by robotic apparatus in, for example, an automobile assembly plant.

The process for positioning and aligning the parts of an assembly is performed by one or more collaborating entities which obtain values for one or more alignment quantities using one or more transportable devices. The values for the entirety of alignment quantities are denoted as alignment data where alignment data includes the three position coordinate values and the three orientation coordinate values of one or more target objects and data derivable from the position coordinate values and orientation coordinate values of one or more target objects. The term "target object" refers to either an assembly part or any other object involved in obtaining alignment data. Each transportable device or target object is associated with an individual coordinate system fixed with respect to the transportable device or target object. The position of a transportable device or target object is defined as the origin of the associated coordinate system. The orientation of a transportable device or a target object is defined as the orientation of the associated coordinate system. Positions and orientations are expressed in terms of coordinate values in a common frame of reference.

A process is subject to a delineation procedure involving first-level, second-level, and higher-level delineations.

FIG. 8 is a first-level delineation of the process for positioning and aligning parts in an assembly consisting of step-plus-functions 11, 12, 13, 14, and 15. The execution of these five steps and the accomplishment of the associated functions constitutes the execution of the process for positioning and aligning parts in an assembly.

The first digit in each digit pair associated with a process step-plus-function identifies a particular first-level delineation of the process. There may be a number of first-level delineations, each delineation constituting a distinct functional embodiment of the process. The second digit in each digit pair identifies a particular step-plus-function associated with the particular first-level delineation.

Figure 9A:
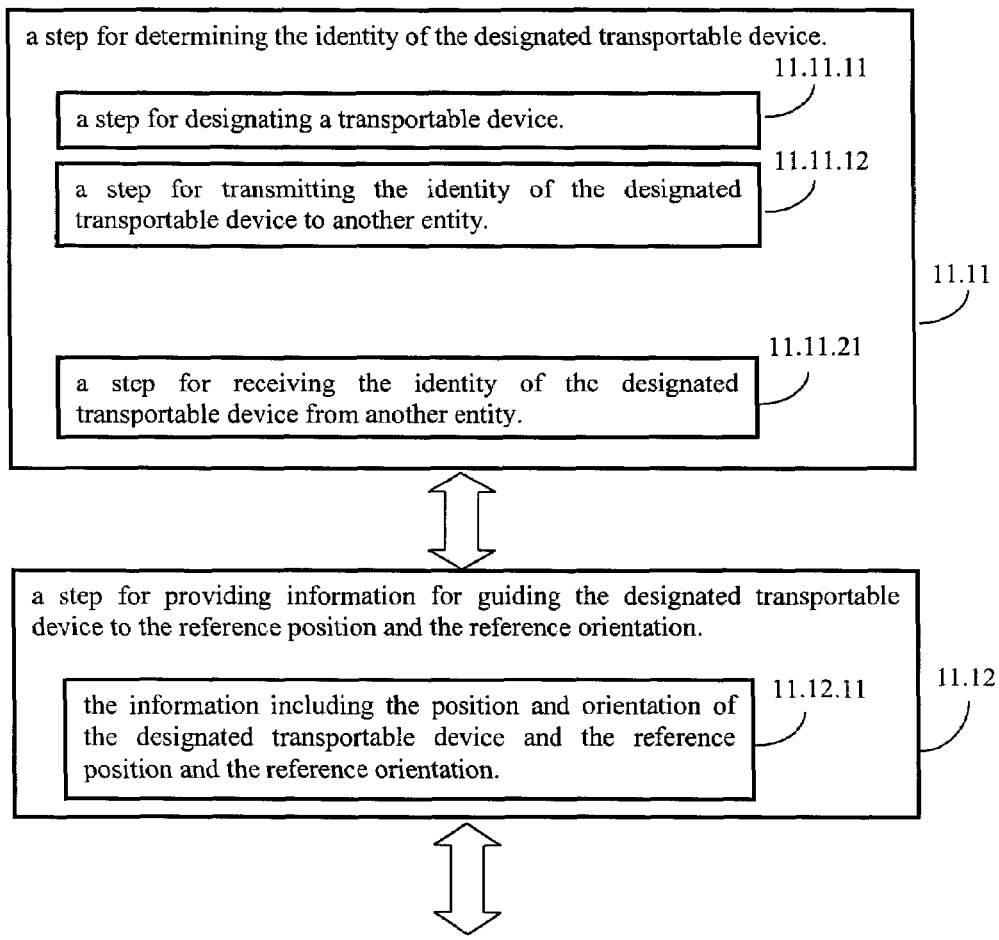
FIG. 9 shows the second and third delineations of step-plus-function 11.
Figure 9B:
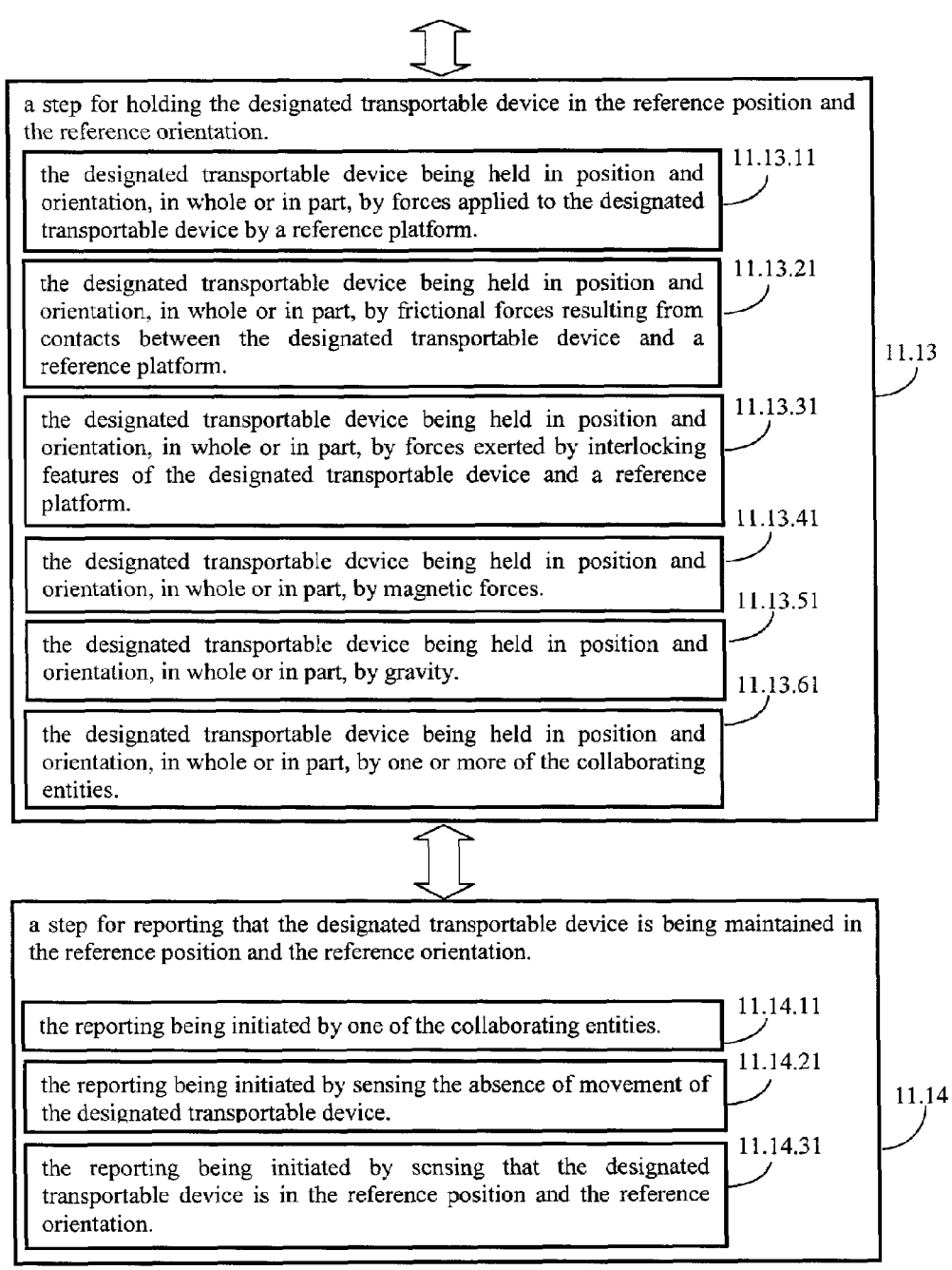

A second-level delineation of the process of positioning and aligning parts in an assembly is obtained by limiting the scope of a function to be performed in some way. For example, FIGS. 9A and 9B show function limitations 11.11, 11.12, 11.13, and 11.14 which individually limit step-plus-function 11. Second- or higher-level delineations may or may not involve steps.

The first digit pair of the function limitations references step-plus-function 11 of the first-level delineation of the process of positioning and aligning parts in an assembly. The first digit in the second digit pair references a particular second-level delineation of step-plus-function 11, and the second digit identifies a particular function limitation of step-plus-function 11 associated with a particular second-level delineation.

Function limitations 11.11, 11.12, 11.13, and 11.14 specify four step-plus-functions which constitute a particular way of executing Step-plus-function 11. Specifically, designating a transportable device and then establishing and maintaining the designated transportable device in a reference position and a reference orientation (step-plus-function 11) could be executed by determining the identity of the designated transportable device (function limitation 11.11), providing information for guiding the designated transportable device to the reference position and the reference orientation (function limitation 11.12), holding the designated transportable device in the reference position and the reference orientation (function limitation 11.13), and reporting that the designated transportable device is being maintained in the reference position and the reference orientation (function limitation 11.14).

A third-level delineation of the process of positioning and aligning parts in an assembly is obtained by limiting the scope of a step-plus-function and a second-level function limitation in some way. For example, FIG. 9A shows that the scope of step-plus-function 11 and function limitation 11.11 can be further limited by function limitations 11.11.11, 11.11.12, and 11.11.21. The first two digit pairs reference a first-level step-plus-function and a second-level function limitation respectively. The first digit in the third digit pair references a particular third-level delineation of second-level function limitation 11.11, and the second digit identifies a particular function limitation associated with a particular third-level delineation.

The third-level function limitations 11.11.11 and 11.11.12 result in designating a transportable device and then transmitting the identity of the designated transportable device to another entity. These function limitations are related in that their execution in combination is a way of executing second-level function limitation 11.11: a step for determining the identity of the designated transportable device. Therefore, the first digit of the third digit pair is the same for these two third-level function limitations.

The third-level function limitation 11.11.21 results in receiving the identity of the designated transportable device from another entity and is another way of accomplishing the result of second-level function limitation 11.11, determining the identity of the designated transportable device. It is separate and distinct from third-level function limitations 11.11.11 and 11.11.12 and consequently, the first digit of the third digit pair is assigned a different value.

The entity that executes a function as further defined by its associated function limitations through the n'th delineation is identified by the same code that identifies the n'th-level function limitation. However, in an embodiment of the invention, entities identified by different codes may in fact be the same entity.

Designation of a transportable device (function limitation 11.11.11) may occur in several different ways. A step-executing entity may designate a particular transportable device by activating a switch on the transportable device. This "designating" action by the entity causes an RP&O indicator lamp to be turned on which provides a visual indication that the transportable device is the "designated transportable device" to be placed in an RP&O, i.e. Reference Position and Orientation. The identity of the designated transportable device may also be transmitted to one or more other entities (function limitation 11.11.12) such as the "controlling entity"— the entity which maintains overall control of the process.

Alternatively, a step-executing entity may remotely designate a transportable device by communicating an identifying name or number associated with a transportable device to another entity (e.g. controller 203 shown in FIG. 7). Or a step-executing entity may maintain a list of available transportable devices and, after beginning the execution of the process, may automatically designate a transportable device from its list. In any case, the RP&O indicator lamp of the designated transportable device is turned on as a result of a communication from the designating entity to the designated transportable device.

The third-level function limitation 11.11.21 results in receiving the identity of the designated transportable device from another entity. Function limitations 11.11.12 and 11.11.21 anticipate that the entity that designates the transportable device may need to communicate the identity of the designated transportable device to some other entity which is responsible for executing a step involving the designated transportable device.

The third-level delineation of function limitation 11.12 is function limitation 11.12.11 which specifies the information for guiding the designated transportable device to the reference position and reference orientation as including the position and orientation of the designated transportable device and the reference position and the reference orientation. This information would be appropriate where either a human user or robotic apparatus were the entity responsible for establishing a transportable device in the reference position and the reference orientation, particularly where a reference platform is involved.

The information provided may be a visual perception of the relative positions and orientations of the designated transportable device and a reference platform which would be particularly appropriate when the visual perception is by the entity directly responsible for establishing a transportable device in the prescribed position and orientation with respect to the reference platform.

The information provided may be a visual perception of the relative positions of visible features incorporated in the designated transportable device and the reference platform. For example, the visible features might be adapter edge 33 and alignment marks 31 shown in FIG. 1 that are intended to line up with alignment marks provided on the reference platform.

The information provided may be a visual, audible, or tactile perception of the degree of engagement of one or more pairs of engaging features incorporated in the designated transportable device and the reference platform where the one or more pairs of engaging features when fully engaged hold the designated transportable device in the reference position and the reference orientation with respect to the reference platform, the degree of engagement of the contacting features being an indication of the difference between the position and the reference position and/or the difference between the orientation and the reference orientation of the designated transportable device with respect to the reference platform.

An example of "engaging features incorporated in the designated transportable device and the reference platform" are the recess 3 of case 1 of a transportable device and protrusion 11 of adapter 7 when used as a reference platform (see FIG. 1).

An entity, experiencing these visual, audible, or tactile perceptions, would be enabled to bring the transportable device into the reference position and the reference orientation with respect to the reference platform.

Function limitation 11.13 results in holding the designated transportable device in the reference position and a reference orientation.

Function limitation 11.13.11 results in the designated transportable device being held in position and orientation, in whole or in part, by forces applied to the designated transportable device by a reference platform.

Function limitation 11.13.21 results in the designated transportable device being held in position and orientation, in whole or in part, by frictional forces resulting from contacts between the designated transportable device and a reference platform.

Function limitation 11.13.31 results in the designated transportable device being held in position and orientation, in whole or in part, by forces exerted by interlocking features of the designated transportable device and a reference platform.

Function limitation 11.13.41 results in the designated transportable device being held in position and orientation, in whole or in part, by magnetic forces.

Function limitation 11.13.51 results in the designated transportable device being held in position and orientation, in whole or in part, by gravity.

Function limitation 11.13.61 results in the designated transportable device being held in position and orientation, in whole or in part, by one or more of the collaborating entities. Function limitation 11.13.61 anticipates either a human being or a robot might be the collaborating entity holding the transportable device in the reference position and the reference orientation for the time required to achieve calibration.

Function limitation 11.14 results in reporting that the designated transportable device is being maintained in the reference position and the reference orientation. Function limitation 11.14 establishes the eligibility of the transportable device to be designated as a result of the execution of step-plus-function 12 as a transportable device to be established and maintained in a prescribed position and a prescribed orientation with respect to a target object. The reporting action may be accomplished by a visual communication resulting from turning on an indicator lamp embedded in the case of the transportable device. In the preferred embodiment, the reporting would be accomplished by radio links between the function entities.

Function limitation 11.14.11 results in the reporting being initiated by one of the collaborating entities. In the preferred embodiment, a human being might push a button embedded in the case of the transportable device in which case the transportable device would cause an indicator lamp embedded in its case to be turned on, thereby providing a visual communication to other function entities.

Function limitation 11.14.21 results in the reporting being initiated by sensing the absence of movement of the designated transportable device. The presence of an inertial navigator in the transportable device makes it easy to sense an absence of movement of the transportable device.

Function limitation 11.14.31 results in the reporting being initiated by sensing that the designated transportable device is in the reference position and the reference orientation. The sensing can be enabled with a switch which is activated when the transportable device is established in the reference position and the reference orientation.

Step-plus-function 12 (FIG. 8) enables a user to establish and then maintain a designated transportable device in one of a class of positions and in one of a class of orientations with respect to a designated target object. For many alignment procedures it is unnecessary to establish a transportable device in a unique position and orientation relative to a target object. For example, in aligning a vehicle wheel, the alignment data of interest pertains to the orientation of the wheel plane. There is no interest in knowing the location of the valve stem. Consequently, when a transportable device is established in a fixed position and orientation with respect to a wheel, the only requirement is that a prescribed plane fixed with respect to the transportable device be parallel to the wheel plane. The orientation of the transportable device with respect to rotations about an axis normal to the wheel plane is of no concern.

Figure 10A:
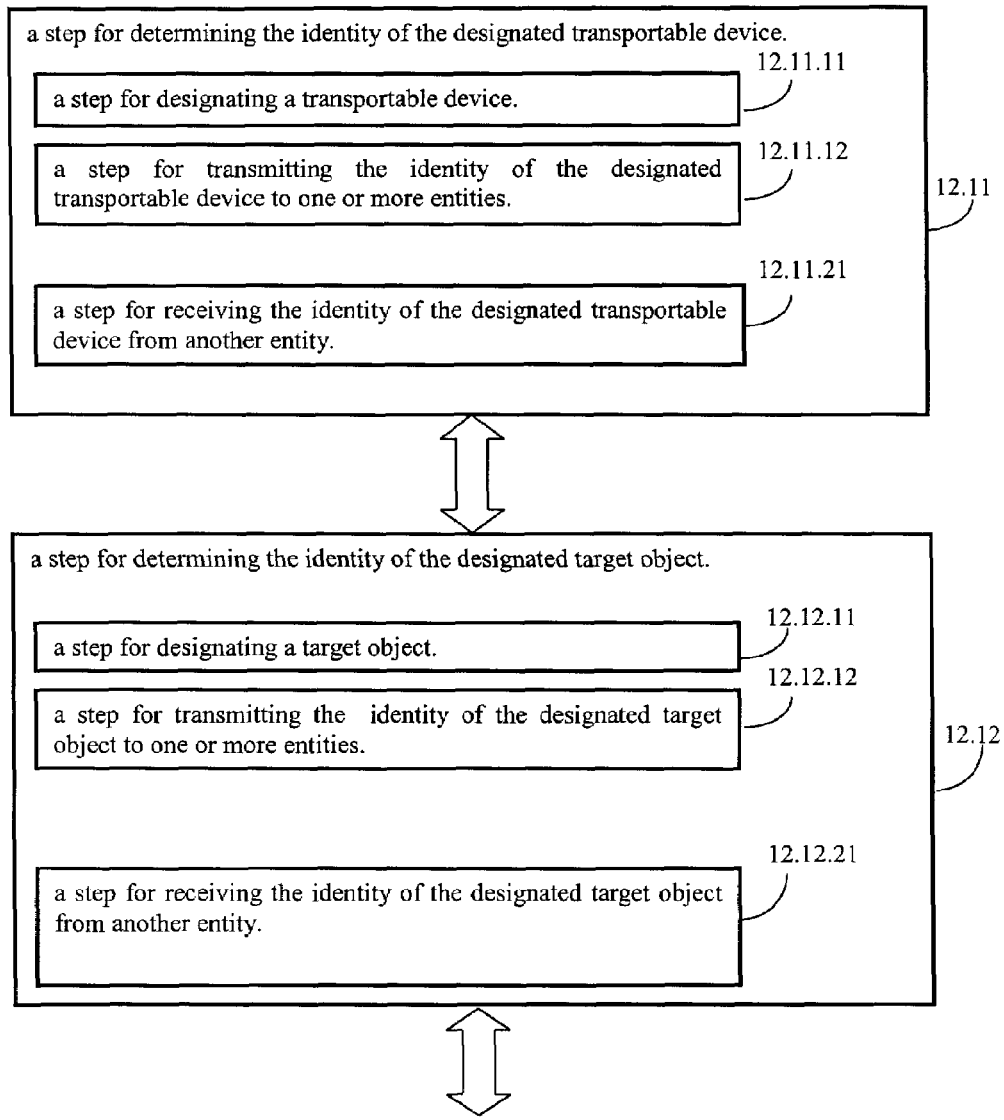
FIG. 10 shows the second and third delineations of step-plus-function 12.
Figure 10B:
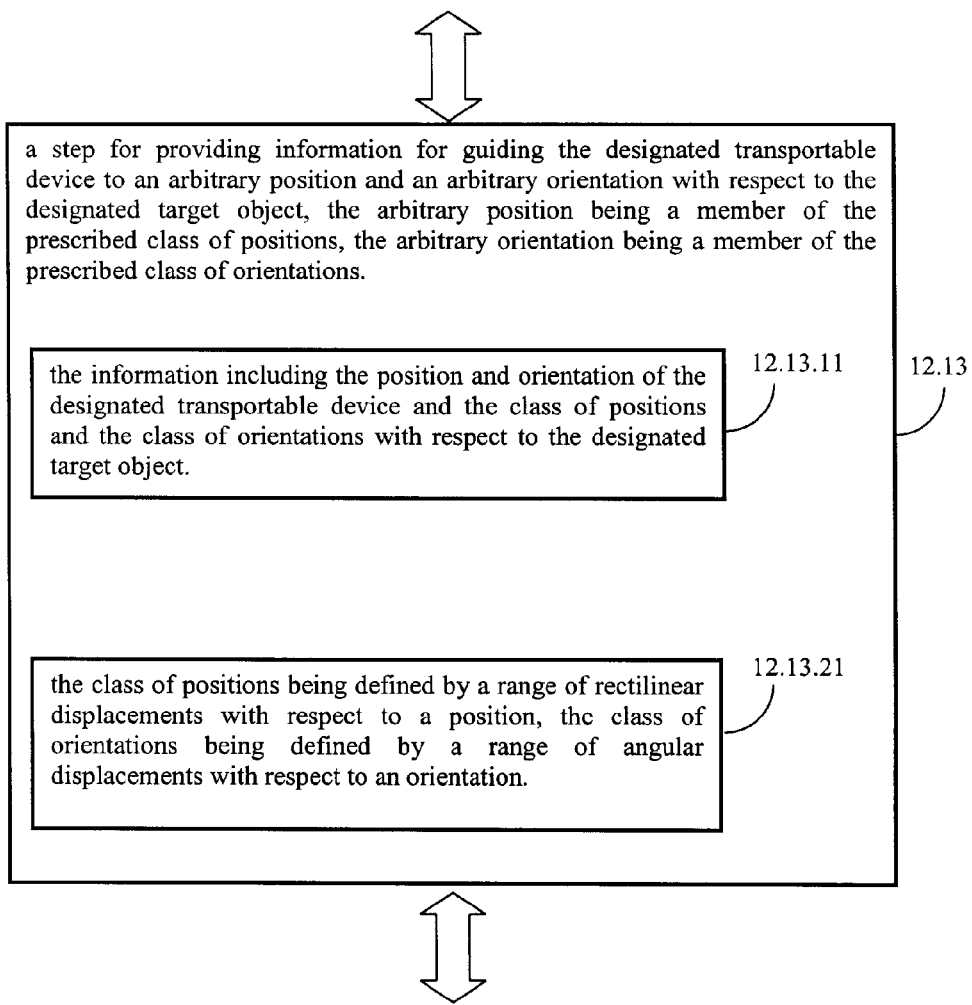

The function limitations pertaining to function 12 are shown in FIGS. 10A, 10B, and 10C.

Function limitation 12.11 is a step for determining the identity of the designated transportable device which is to interface with a target object.

Function limitations 12.11.11 and 12/11/12 are steps for designating a transportable device and transmitting the identity of the designated transportable device to one or more other function entities. Function limitations 12.11.11/12 recognize the possibility that a function entity that must know the identity of the designated transportable device may not be the function entity that is the designating function entity.

Only those transportable objects which are in calibration may be designated for target object interfacing. A transportable object that is "in calibration" is one for which the maintained position coordinates and the maintained orientation coordinates resulting from the execution of function 13 meet prescribed accuracy requirements. In practice, a transportable device is assumed to be in calibration if the time period since the transportable device was calibrated as a result of being interfaced with the reference platform is less than a prescribed value. In the case of the embodiment described herein, an in-calibration indicator lamp incorporated in command/control panel 37 (FIG. 1) of a transportable object remains on for the in-calibration time period.

Designation of a transportable device for interfacing with a target object may occur in several different ways. A collaborating entity may designate a particular transportable device by activating a switch on the transportable device. This designating action by the collaborating entity causes a TO indicator lamp to be turned on which provides a visual indication that the transportable device intended for a Target Object (TO) has been designated. The identity of the designated transportable device is also communicated to controller 203 (FIG. 7) which is the collaborating entity's intermediary in maintaining overall control of the alignment process.

Alternatively, a collaborating entity may designate a transportable device by entering an identifying name or number associated with a transportable device into controller 203 (FIG. 7). Or controller 203 may maintain a list of available transportable devices which are "in calibration" and, upon startup by a collaborating entity, may automatically designate a transportable device from its list. In any case, the TO indicator lamp of the designated transportable device is turned on as a result of a communication from the controller to the designated transportable device.

Function limitation 12.11.21 is a step for receiving the identity of the designated transportable device from another function entity. This function limitation becomes necessary if a function entity is to perform a function involving the designated transportable device and the function entity is not collocated with the designating function entity.

Function limitation 12.12 results in determining the identity of the designated target object to which the transportable object designated as a result of function limitation 12.11 is to be interfaced.

Third-level function limitations 12.12.11 and 12.12.12 are steps for designating a target object and transmitting the identity of the designated target object to one or more other function entities. Function limitations 12.12.11/12 provide for the possibility that a function entity that must know the identity of the designated target object may not be the function entity that is the designating function entity.

Designation of a target object may occur in several different ways. A collaborating entity may designate a particular target object by entering the name or number of the target object into the designated transportable device via an alphanumeric keyboard in command/control panel 37 (FIG. 1). This action results in the name or number of the target object being displayed on command/control panel 37 thereby confirming the collaborating entity's input. In addition, the identity of the designated target object is communicated to controller 203 (FIG. 7) which is the collaborating entity's intermediary in maintaining overall control of the alignment process.

Alternatively, a collaborating entity may designate a target object by entering the name or number of the target object into controller 203 (FIG. 7). Or controller 203 may designate a target object in accordance with an alignment procedure selected by a collaborating entity. In either case, name or number of the designated target object is communicated to the function entities involved in executing Step-plus-function 12.

In the case of the embodiment described herein, the identity of the designated target object is communicated to the transportable device designated as a result of function limitation 12.11 and displayed on command/control panel 37 (FIG. 1). In addition, the identity of the appropriate adapter to be used in coupling the transportable device to the target object and instructions as to how to accomplish the coupling (if such are needed) is also displayed.

Function limitation 12.12 is further delineated by function limitation 12.12.21—receiving the identity of the designated target object from another function entity.

Step-plus-function 12 is further delineated by function limitation 12.13 which results in providing information for guiding the designated transportable device to an arbitrary position and an arbitrary orientation with respect to the designated target object, the arbitrary position being a member of the class of positions and the arbitrary orientation being a member of the class of orientations.

Function limitation 12.13 is further delineated by function limitation 12.13.11 which results in the provided information including the position and orientation of the designated transportable device and the class of positions and the class of orientations with respect to the designated target object.

The information provided may be a visual perception of the relative positions and orientations of the designated transportable device, equipped with an appropriate adapter if required, and the designated target object. The information provided may be a visual perception of the relative positions of visible features incorporated in the designated transportable device or adapter and the target object. For example, the visible features might be adapter wedges 45, 47, and 51 (FIG. 5) and a wheel rim onto which the adapter wedges are intended to hook.

The information provided may be a visual, audible, or tactile perception of the degree of engagement of one or more pairs of engaging features incorporated in the designated transportable device's adapter and the target object where the one or more pairs of engaging features when fully engaged hold the designated transportable device in a prescribed position and orientation with respect to the reference platform, the degree of engagement of the contacting features being indicative of the difference between the present position and the prescribed position and/or the difference between the present orientation and the prescribed orientation of the designated transportable device with respect to the target object.

Function limitation 12.13.21 results in the class of positions being defined by a range of rectilinear displacements with respect to a position and the class of orientations being defined by a range of angular displacements with respect to an orientation.

Either class may contain only a single member in which case the associated range is equal to zero.

The class of positions and the class of orientations may be those positions and orientations resulting from every angular displacement in a range of angular displacements of the transportable device with respect to the target object about an axis of rotation.

The class of positions and the class of orientations may be those positions and orientations resulting from every rectilinear displacement in a range of rectilinear displacements of the transportable device with respect to the target object along an axis.

The class of positions and the class of orientations may be those positions and orientations resulting from every angular displacement in a range of angular displacements of the transportable device with respect to the target object about an axis of rotation and every rectilinear displacement in a range of rectilinear displacements of the transportable device with respect to the target object along an axis.

Step-plus-function 12 is further delineated by function limitation 12.14 which results in holding the designated transportable device in one of the class of positions and in one of the class of orientations with respect to the designated target object.

Function limitation 12.14.11 results in the designated transportable device being held in position and orientation, in whole or in part, by forces applied to the designated transportable device directly or indirectly by the designated target object.

Function limitation 12.14.21 results in the designated transportable device being held in position and orientation, in whole or in part, by frictional forces.

Function limitation 12.14.31 results in the designated transportable device being held in position and orientation, in whole or in part, by forces exerted by interlocking features of the designated transportable device or an attached device and the designated target object.

Function limitation 12.14.41 results in the designated transportable device being held in position and orientation, in whole or in part, by magnetic forces.

Function limitation 12.14.51 results in the designated transportable device being held in position and orientation, in whole or in part, by gravity. For example, where the designated target object is the surface upon which the vehicle to be aligned rests, the force of gravity would suffice in holding the designated transportable device in the prescribed position and orientation with respect to the designated target object.

Function limitation 12.14.61 results in the designated transportable device being held in position and orientation, in whole or in part, by one of the collaborating entities. For example, a human being could manually hold the transportable device against the target object in the prescribed position and orientation. Or a human being might use a spring clamp to hold the transportable device in contact with the target object.

The execution of function limitation 12.14 with respect to each of the one or more target objects whose position and orientation is to be determined is key to successfully practicing the method. The accomplishment of this task is reported as a result of function limitation 12.15.

Function limitation 12.15 specifies reporting that the designated transportable device is being maintained in one of the class of positions and in one of the class of orientations with respect to the designated target object. The reporting action may be initiated in a number of different ways.

Function limitation 12.15.11 specifies the reporting being initiated by one of the collaborating entities. Since a human being would typically establish the transportable device in the prescribed position and orientation with respect to the target object, he or she is the logical one to enter a reporting command into function entity 12.15.11 thereby initiating the reporting action by the function entity to other step entities. In terms of the embodiment described herein, the user might enter a reporting command into the transportable device or the controller, depending upon the design details of the system. The function entity receiving the input would then communicate the information to the other function entities of the system.

There are other alternatives to a collaborating entity initiating the reporting function. Function limitation 12.15.21 specifies the reporting being initiated be sensing the absence of movement of the designated transportable device. In the case of the embodiment described herein, the inertial navigator in a transportable device provides the means for recognizing an absence of movement of the transportable device.

Another approach to initiating the reporting task is provided by function limitation 12.15.31 which specifies the reporting being initiated by sensing that the designated transportable device is in a position and orientation that are included respectively in the prescribed class of positions and the prescribed class of orientations. In the case of the embodiment described herein wherein adapter 41 shown in FIG. 5 is used to attach a transportable object to the wheel of a vehicle, the attachment of the transportable device to the adapter and a continuing extension of spring-loaded arm 49 would be an indicator that the transportable device had been installed in a prescribed position and orientation with respect to the wheel and could be used to initiate the reporting task.

Figure 11A:
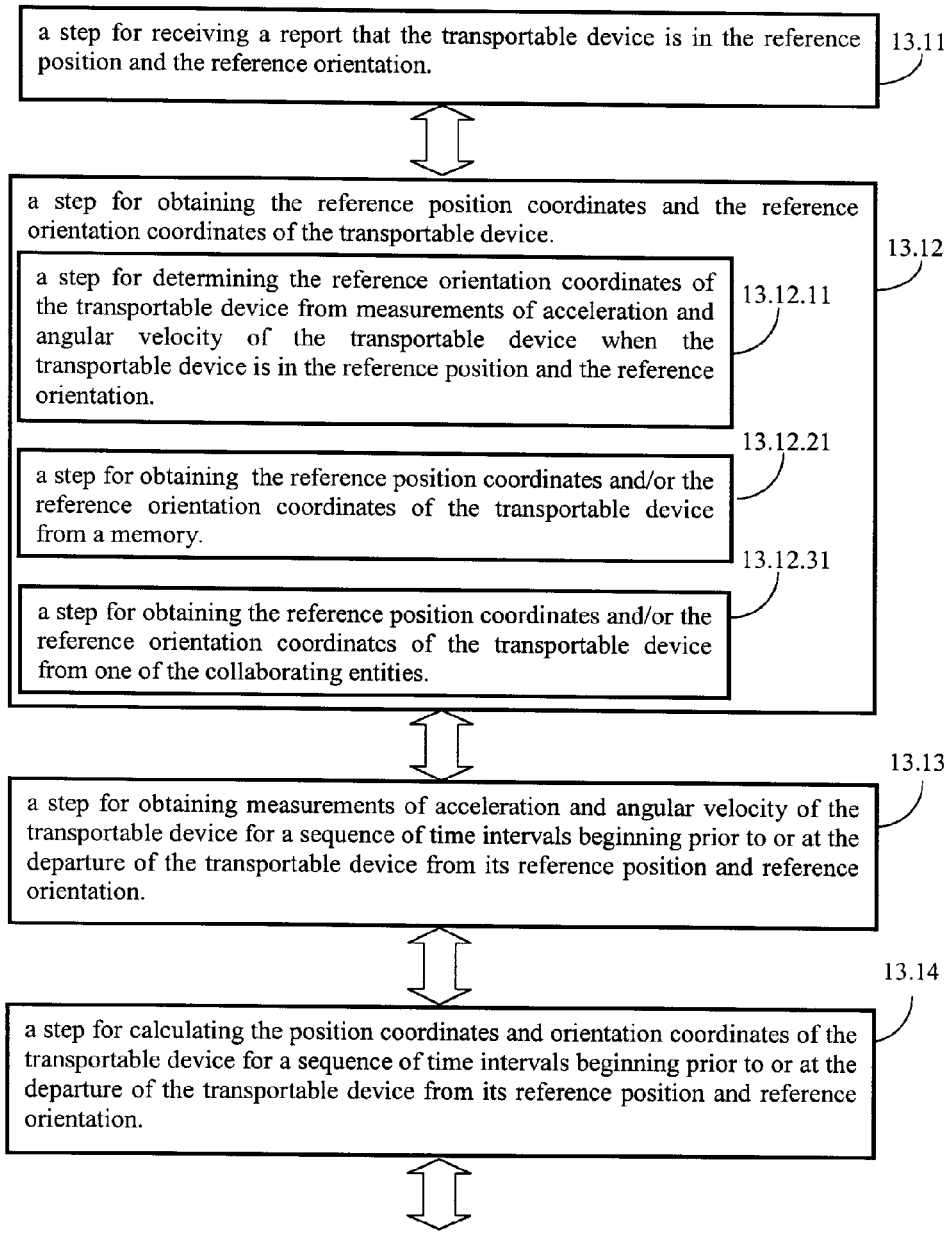
FIG. 11 shows the second and third delineations of step-plus-function 13.
Figure 11B:
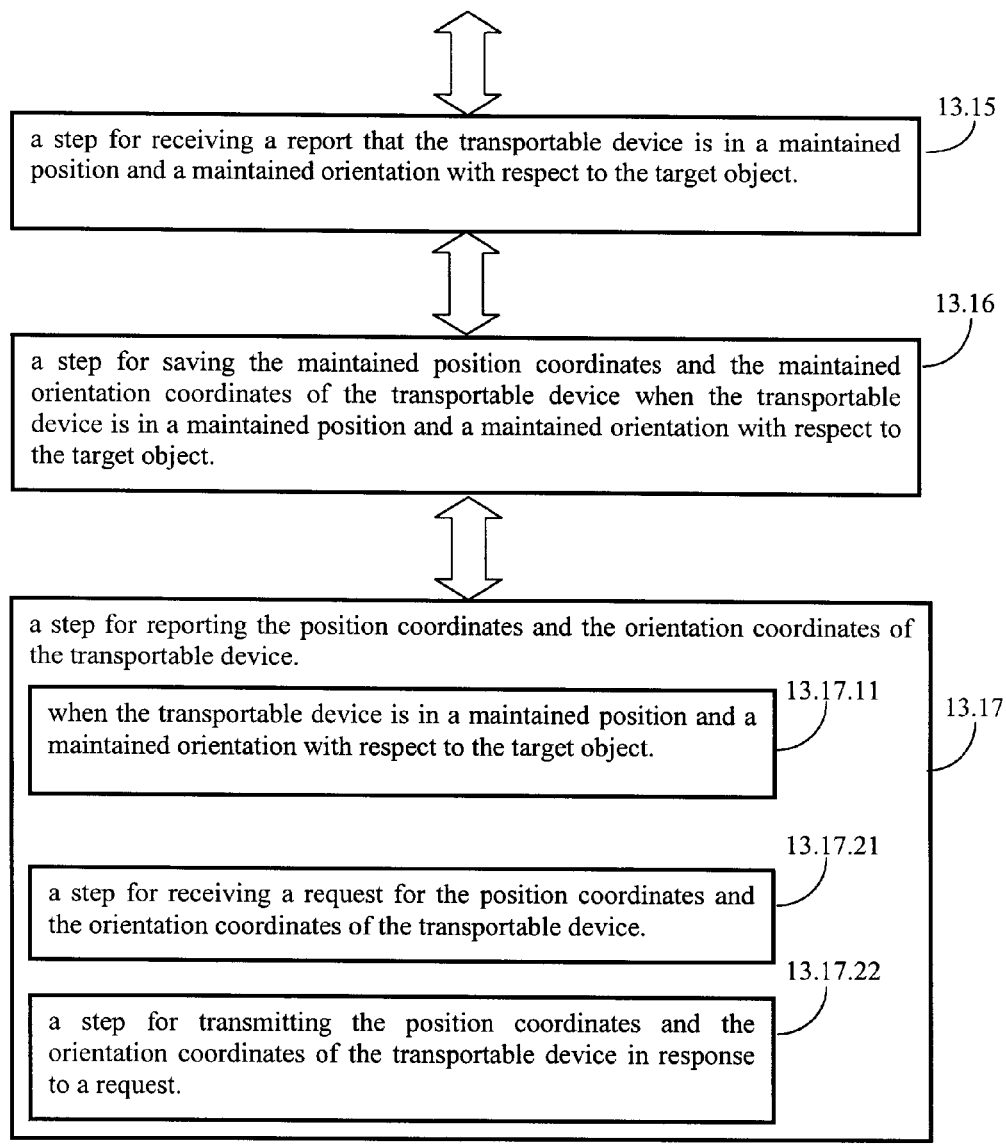

Step-plus-function 13 specifies determining the maintained position coordinates and the maintained orientation coordinates of a transportable device when the transportable device is being maintained in a fixed position and orientation with respect to a target object from measurements of acceleration and angular velocity of the transportable device as it moves from a reference position to the fixed position and as it rotates from a reference orientation to the fixed orientation. The higher-level delineations of step-plus-function 13 are shown in FIGS. 11A and 11B.

Function limitation 13.11 specifies receiving report that the transportable device is in the reference position and the reference orientation.

Function limitation 13.12 is a step for obtaining the reference position coordinates and the reference orientation coordinates of the transportable device.

Function limitation 13.12 is further delineated in function limitations 13.12.11, 13.12.21, and 13.12.31.

Function limitation 13.12.11 is a step for determining the reference orientation coordinates of the transportable device from measurements of acceleration and angular velocity of the transportable device when the transportable device is in the reference position. The process is described in many papers and textbooks, e.g. Jay A. Farrell & Matthew Barth, *The Global Positioning System & Inertial Navigation*, Chapter 6, McGraw-Hill, New York, N.Y. (1999).

The reference position coordinates and reference orientation coordinates of a transportable device can be measured independently of the parts alignment process by conventional surveying techniques and stored in memory. Function limitation 13.12.21 is a step for obtaining the reference position coordinates and the reference orientation coordinates of the transportable device from a memory.

Function limitation 13.12.31 specifies obtaining the reference position coordinates and the reference orientation coordinates of the transportable device from one of the collaborating entities.

Function limitation 13.13 is a step for obtaining measurements of acceleration and angular velocity of the transportable device for a sequence of time intervals beginning prior to or at the departure of the transportable device from its reference position and reference orientation.

Function limitation 13.14 is a step for calculating the position coordinates and orientation coordinates of the transportable device for a sequence of time intervals beginning prior to or at the departure of the transportable device from its reference position and reference orientation. Function limitations 13.12, 13.13, and 13.14 describe the process of inertial navigation, and the details of the process can be found in countless papers and books, e.g. Paul G. Savage, *Strapdown Analytics*, Strapdown Associates, Inc., Maple Plain, Minn. (2000).

Function limitation 13.15 specifies receiving a report that the transportable device is in a maintained position and a maintained orientation with respect to the target object. This report originates as a result of performing function limitation 13.15.

Function limitation 13.16 specifies saving the maintained position coordinates and the maintained orientation coordinates of the transportable device when the transportable device is in a maintained position and a maintained orientation with respect to the target object.

Function limitation 13.17 specifies reporting the position coordinates and the orientation coordinates of the transportable device.

Function limitation 13.17 is further delineated by function limitation 13.17.11 and function limitations 13.17.21 and 13.17.22.

Function limitation 13.17.11 specifies reporting when the transportable device is in a maintained position and a maintained orientation with respect to the target object.

Function limitation 13.17.21 is a step for receiving a request for the position coordinates and the orientation coordinates of the transportable device, and function limitation 13.17.22 is a step for transmitting the position coordinates and the orientation coordinates of the transportable device in response to a request.

Figure 12A:
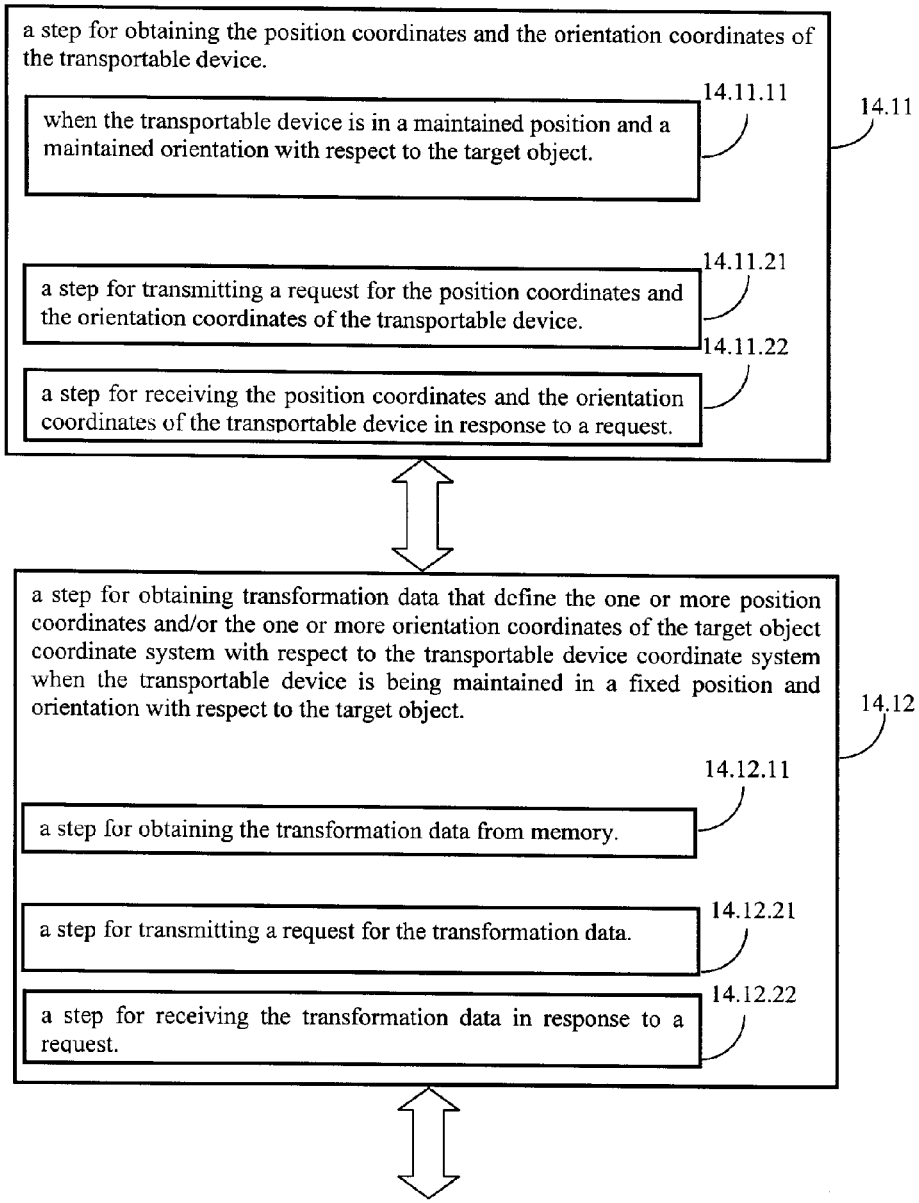
FIG. 12 shows the second and third delineations of step-plus-function 14.
Figure 12B:
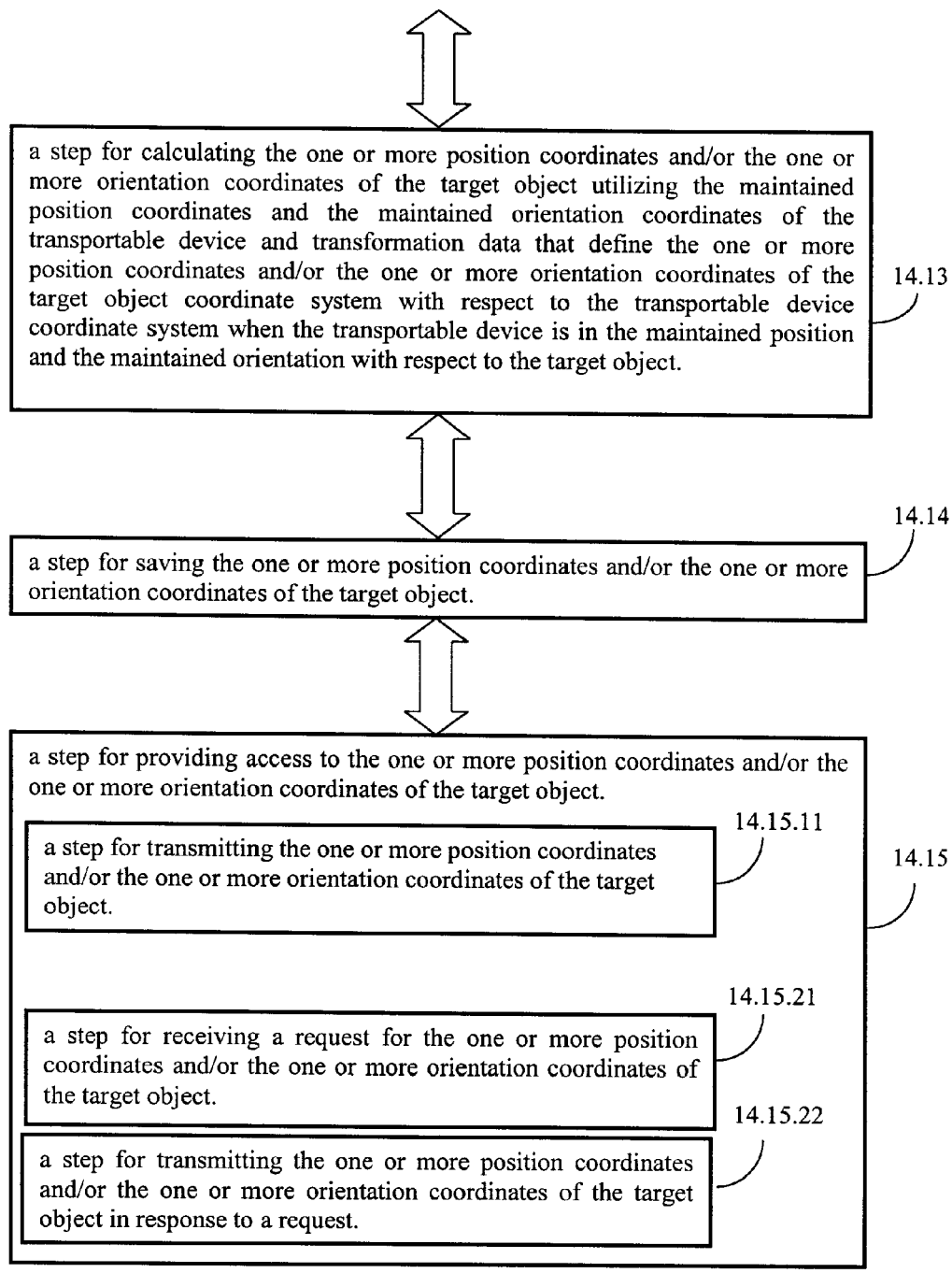

Step-plus-function 14 is a step for determining one or more of the position coordinates and/or one or more of the orientation coordinates of a target object from the maintained position coordinates and the maintained orientation coordinates of a transportable device when the transportable device is in a maintained position and a maintained orientation with respect to the target object. The function limitations pertaining to function 14 are shown in FIGS. 12A and 12B.

Function limitation 14.11 is a step for obtaining the position coordinates and the orientation coordinates of the transportable device. Function limitation 14.11 is further delineated by function limitation 14.11.11 and function limitations 14.11.21 and 14.11.22.

Function limitation 14.11.11 specifies that the position and orientation coordinates are obtained when the transportable device is in a maintained position and a maintained orientation with respect to the target object.

Function limitations 14.11.21/22 are the steps for transmitting a request for the position coordinates and the orientation coordinates of the transportable device and receiving the position coordinates and the orientation coordinates of the transportable device in response to a request.

Function limitation 14.12 specifies obtaining transformation data that defines the one or more position coordinates and/or the one or more orientation coordinates of the target object coordinate system with respect to the transportable device coordinate system when the transportable device is being maintained in a fixed position and orientation with respect to the target object. Function limitation 14.12 is further delineated by function limitation 14.12.11 and function limitations 14.12.21 and 14.12.22

Function limitation 14.12.11 is a step for obtaining the transformation data from memory.

Function limitations 14.12.21/22 are steps for transmitting a request for the transformation data and receiving the transformation data in response to a request.

Function limitation 14.13 is a step for calculating the one or more position coordinates and/or the one or more orientation coordinates of the target object utilizing the maintained position coordinates and the maintained orientation coordinates of the transportable device and transformation data that define the one or more position coordinates and/or the one or more orientation coordinates of the target object coordinate system with respect to the transportable device coordinate system when the transportable device is in the maintained position and the maintained orientation with respect to the target object.

Function limitation 14.14 is a step for saving the one or more position coordinates and/or the one or more orientation coordinates of the target object.

Function limitation 14.15 is a step for providing the one or more position coordinates and/or the one or more orientation coordinates of the target object.

Function limitation 14.15.11 is a step for transmitting the one or more position coordinate and/or the one or more orientation coordinates of the target object.

Function limitations 14.15.21/22 are steps for receiving a request for the one or more position coordinates and/or the one or more orientation coordinates of the target object and transmitting the one or more position coordinates and/or the one or more orientation coordinates of the target object in response to a request.

Figure 13A:
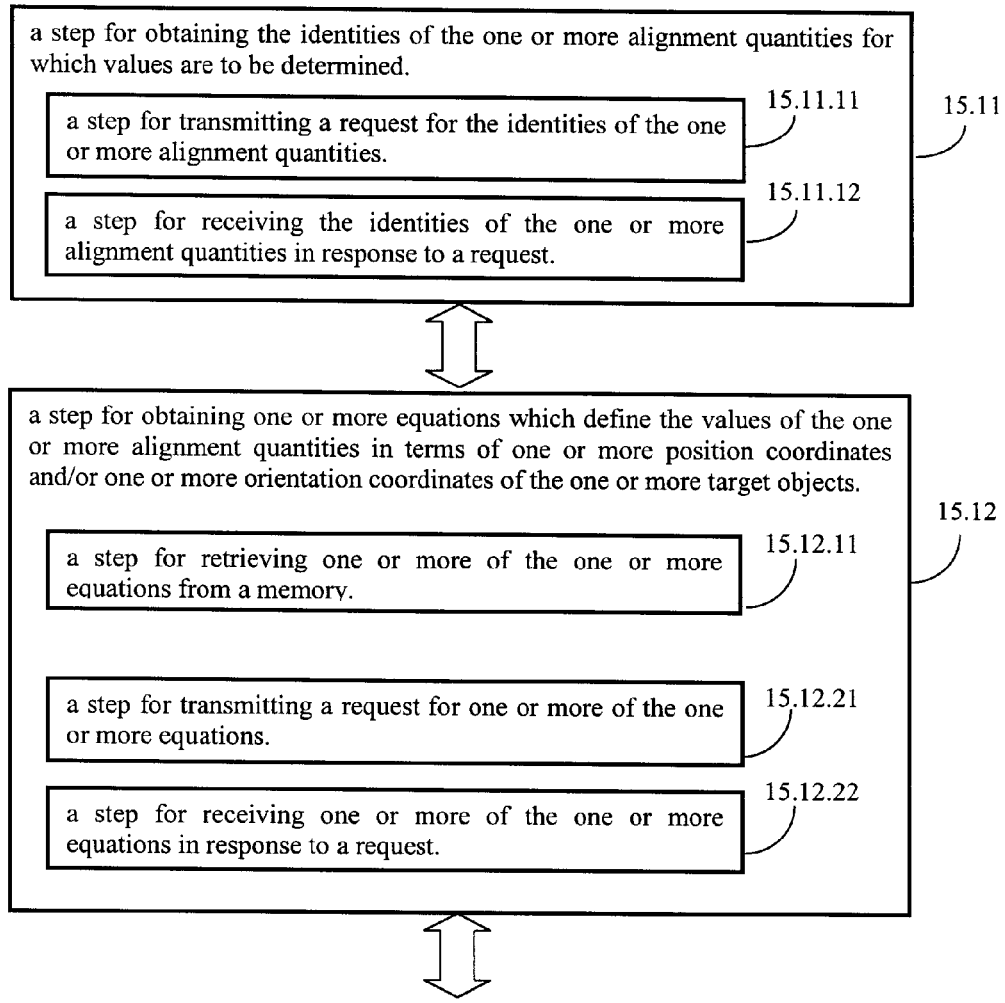
FIG. 13 shows the second and third delineations of step-plus-function 15.
Figure 13C:
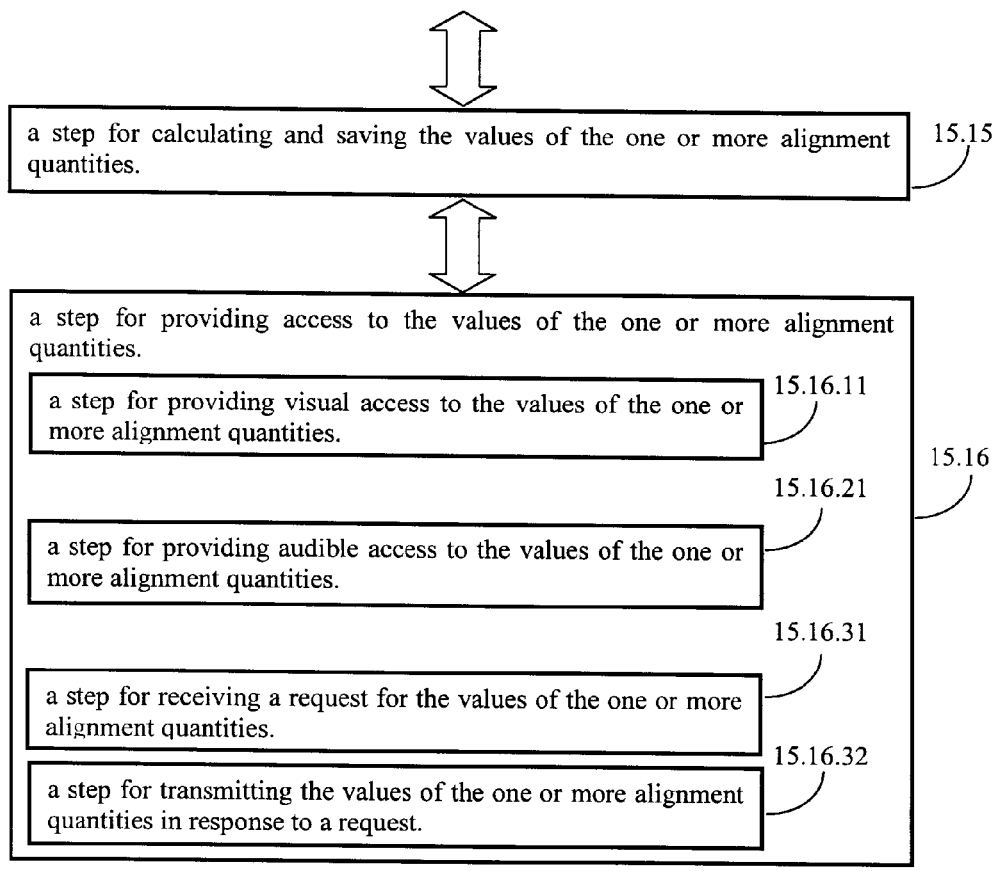

Step-plus-function 15 specifies determining the values of one or more alignment quantities utilizing one or more position coordinates and/or one or more orientation coordinates of one or more target objects. The function limitations pertaining to function 15 are shown in FIGS. 13A, 13B, and 13C.

Function limitation 15.11 is a step for obtaining the identities of the one or more alignment quantities for which values are to be determined.

Function limitations 15.11.11/12 are steps for transmitting a request for the identities of the one or more alignment quantities and receiving the identities of the one or more alignment quantities in response to a request.

Function limitation 15.12 is a step for obtaining one or more equations which define the values of the one or more alignment quantities in terms of one or more position coordinates and/or one or more orientation coordinates of the one or more target objects.

Function limitation 15.12.11 is a step for retrieving one or more of the one or more equations from a memory.

Function limitation 15.12.21/22 are steps for transmitting a request for one or more of the one or more equations and receiving one or more of the one or more equations in response to a request.

Function limitation 15.13 is a step for obtaining the identities of the one or more target objects whose one or more position coordinates and/or one or more orientation coordinates are required to determine the values of the one or more alignment quantities.

Function limitation 15.13.11 is a step for retrieving the identities of one or more of the one or more target objects from a memory.

Function limitations 15.13.21 and 15.13.22 are steps for transmitting a request for the identities of one or more of the one or more target objects and receiving the identities of one or more of the one or more target objects in response to a request.

Function limitation 15.13.31 is a step for identifying the target objects that are referenced in the one or more equations which define the one or more alignment quantities.

Function limitation 15.14 is a step for obtaining one or more of the position coordinates and/or one or more of the orientation coordinates of a designated target object utilizing a designated transportable device, the step being executed for each of the one or more target objects that are utilized in determining the values of the one or more alignment quantities.

Function limitation 15.14.11 is a step for determining the identity of the designated transportable device to be placed in a reference position and a reference orientation. Function limitation 15.14.11 may be limited by steps for designating a transportable device and transmitting the identity of the designated transportable device to one or more of the collaborating entities. Function limitation 15.14.11 may also be limited by a step for receiving the identity of the designated transportable device from another entity.

Function limitation 15.14.12 is a step for determining the identity of the designated transportable device to be placed in a position and an orientation with respect to the designated target object. Function limitation 15.14.12 may be limited by steps for designating a transportable device and transmitting the identity of the designated transportable device to one or more of the collaborating entities. Functional limitation 15.14.12 may also be limited by a step for receiving the identity of the designated transportable device from another entity.

Function limitation 15.14.13 is a step for determining the identity of the designated target object. Function limitation 15.14.13 may be limited by steps for designating a target object and transmitting the identity of the designated target object to one or more of the collaborating entities. Function limitation 15.14.13 may also be limited by a step for receiving the identity of the designated target object from another entity.

Function limitation 15.14.14 is a step for receiving notification that the one or more position coordinates and/or the one or more orientation coordinates of the target object are available. Function limitation 15.14.14 may be limited by the notification being accompanied by the one or more position coordinates and/or the one or more orientation coordinates. Function limitation 15.14.14 may also be limited by steps for transmitting a request for one or more position coordinates and/or one or more orientation coordinates of the target object and receiving one or more position coordinates and/or one or more orientation coordinates of the target object in response to a request.

Function limitation 15.15 is a step for calculating and saving the values of the one or more alignment quantities.

Function limitation 15.16 is a step for providing access to the values of the one or more alignment quantities.

Function limitation 15.16.11 is a step for providing visual access to the values of the one or more alignment quantities.

Function limitation 15.16.21 is a step for providing audible access to the values of the one or more alignment quantities.

Function limitations 15.16.31/32 are steps for receiving a request for the values of the one or more alignment quantities and transmitting the values of the one or more alignment quantities in response to a request.

Apparatus for positioning and aligning parts in an assembly specified in terms of means-plus-functions is shown in FIG. 14. The apparatus positions and aligns parts in an assembly by obtaining values of one or more alignment quantities. The values for the entirety of alignment quantities is denoted as alignment data which includes the three position coordinate values and the three orientation coordinate values of one or more target objects and data derivable from the position coordinate values and orientation coordinate values.

The term "target object" refers to either an assembly part or any other object involved in obtaining alignment data, a target object being associated with an individual coordinate system fixed with respect to the target object. The position of a target object is defined as the origin of the associated coordinate system and the orientation of a target object is defined as the orientation of the associated coordinate system. The positions and orientations are expressed in terms of coordinate values in a common frame of reference.

The apparatus comprises a number of collaborating entities identified in FIG. 14 as a p&o determining means 21, a t-o computing means 22, an a-q computing means 23, and a c&c means 24.

The p&o determining means determines the values of maintained position coordinates and maintained orientation coordinates of the p&o determining means when the p&o determining means is being maintained in a fixed position and a fixed orientation with respect to a target object. The values of the maintained position coordinates and the maintained orientation coordinates are determined from measurements of acceleration and angular velocity by the p&o determining means as it moves from a reference position to the fixed position and as it rotates from a reference orientation to the fixed orientation, the fixed position being one of a class of positions and the fixed orientation being one of a class of orientations fixed with respect to a target object.

The p&o determining means is associated with an individual coordinate system fixed with respect to the p&o determining means. The position of the p&o determining means is defined as the origin of the associated coordinate system, and the orientation of the p&o determining means is defined as the orientation of the associated coordinate system.

The t-o computing means determines the values of one or more of the position coordinates and/or one or more of the orientation coordinates of one or more target objects from the maintained position coordinate values and the maintained orientation coordinate values of the p&o determining means 21 with respect to the one or more target objects.

The a-q computing means determines the values of one or more alignment quantities utilizing one or more position coordinates and/or one or more orientation coordinates of one or more target objects;

The c&c means exercises overall command and control over the collaborating entities under the direction of a user by causing data and/or commands to be communicated among the collaborating entities and the user.

Figure 15B:
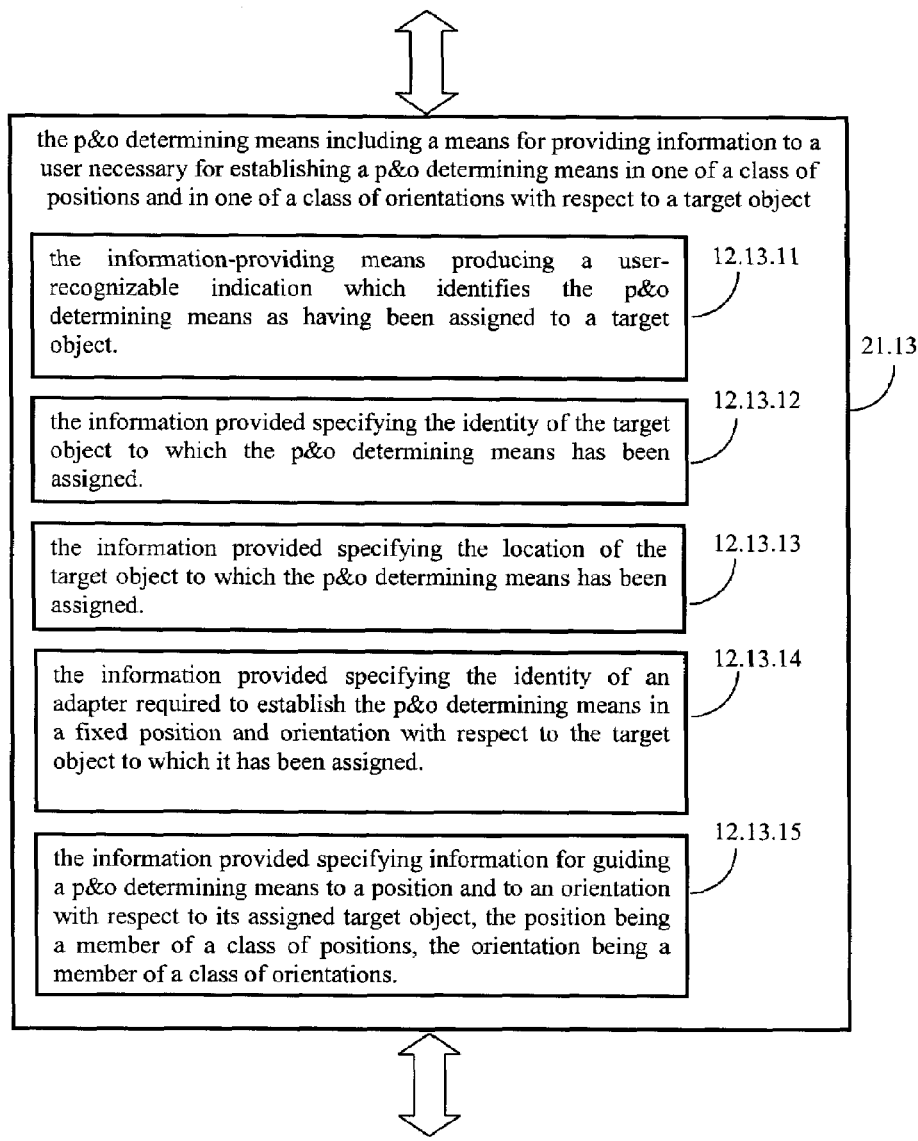
FIG. 15 shows the second and third delineations of means-plus-function 21.

The second- and third-level delineations of p&o determining means are shown in FIGS. 15A, 15B, and 15C.

Function limitation 21.11 results in the p&o determining means 21 including a means for providing information to a user necessary for establishing a designated p&o determining means in a reference position and a reference orientation for the purpose of calibration.

Function limitation 21.12 results in the p&o determining means including a means for holding the p&o determining means in a reference position and a reference orientation.

Function limitation 21.13 results in the p&o determining means including a means for providing information to a user necessary for establishing a p&o determining means in one of a class of positions and in one of a class of orientations with respect to a target object.

Function limitation 21.14 results in the p&o determining means including a means for holding the p&o determining means in a fixed position and a fixed orientation with respect to a target object.

Function limitation 21.15 results in the p&o determining means including a means for obtaining information necessary for the determination of the position and orientation of a target object.

Function limitation 21.16 results in the p&o determining means including a means for obtaining measurements of acceleration and angular velocity of the p&o determining means for a sequence of time intervals beginning prior to or at the departure of the p&o determining means from its reference position and reference orientation.

Function limitation 21.17 results in the p&o determining means including a means for calculating the position coordinates and orientation coordinates of the p&o determining means at a sequence of time intervals beginning prior to or at the departure of the p&o determining means from its reference position and reference orientation.

Function limitation 21.18 results in the p&o determining means including a means for memorializing its position and orientation after it assumes its maintained position and maintained orientation with respect to the target object.

Function limitation 21.19 results in the p&o determining means including a means for reporting its position coordinates and its orientation coordinates to one or more collaborating entities.

The third-level delineations of function limitation 21.11 shown in FIG. 15A further define the information-providing means of function limitation 21.11.

Function limitation 21.11.11 specifies that the information-providing means produces a user-recognizable signal which identifies the p&o determining means as having been designated for calibration. For example, the signal might be the transmission of a sound wave or an electromagnetic wave which a user could sense or the transmission of a sound wave or electromagnetic wave which a device associated with a user could sense.

Function limitation 21.11.12 identifies the information provided by the information-providing means as including the location where the p&o determining means is to be established in a reference position and in a reference orientation. The location might, for example, be specified by an identifying name or number or by grid coordinates in a room or building.

Function limitation 21.11.13 identifies the information provided by the information-providing means as including information for guiding a designated p&o determining means to the reference position and the reference orientation. The information might, for example, be in the visual perception of the structural features and/or markings of the p&o determining means housing in the context of a reference platform having congruent structural features and/or markings, the visual perception suggesting how the p&o determining means is to be placed on the reference platform so as to be in the reference position and the reference orientation.

The information might alternatively be in the visual perception of structural features of the p&o determining means in the context of a reference platform having structural features intended for engagement with those of the p&o determining means, the degree of engagement being an indication of the difference between the position and the reference position and/or the difference between the orientation and the reference orientation of the p&o determining means, the information being provided as a visual, audible, or tactile perception of the degree of engagement of the one or more pairs of engaging features, the one or more pairs of engaging features when fully engaged holding the designated transportable device in the reference position and the reference orientation.

Function limitation 21.11.14 identifies the information provided by the information-providing means as indicating when the p&o determining means is in the reference position and the reference orientation. The indication might, for example, be the alignment of one or more marks on the p&o determining means housing with corresponding marks on the reference platform. Or the indication might be the contacting of one or more features on the p&o determining means housing with corresponding features on the reference platform. Or the indication might be the action of detents in locking engaging features of the p&o determining means and the reference platform together.

The third-level delineations of function limitation 21.12 shown in FIG. 15A further define the holding means of function limitation 21.12.

Function limitation 21.12.11 specifies that the holding means facilitates a human or robotic means in grasping and holding the p&o determining means in a reference position and a reference orientation.

Function limitation 21.12.21 specifies that the holding means cooperates with a holding means associated with a reference platform. For example, the holding means might cause the p&o determining means to be held in the reference position and the reference orientation, in whole or in part, by (1) forces applied to the p&o determining means by the reference platform, (2) frictional forces resulting from contacts between the p&o determining means and the reference platform, (3) forces exerted by interlocking features of the p&o determining means and the reference platform, (4) magnetic forces, or (5) gravity.

Function limitation 21.12.31 specifies that the holding means informs one or more collaborating entities when the p&o determining means is being held in a reference position and a reference orientation.

The third-level delineations of function limitation 21.13 shown in FIG. 15B further define the information-providing means and the information provided by the information-providing means of function limitation 21.13.

Function limitation 21.13.11 specifies that the information-providing means produces a user-recognizable indication which identifies the p&o determining means as having been assigned to a target object. The indication might be, for example, the transmission of a sound wave or electromagnetic wave which a user can sense. Or the indication might be the transmission of a sound wave or electromagnetic wave which a device associated with a user can sense.

Function limitation 21.13.12 specifies that the information provided includes the identity of the target object to which the p&o determining means has been assigned. For example, the information-providing means might include a means for displaying an identifying name or number of the target object assigned to the p&o determining means or a means for delivering an audio message containing an identifying name or number of the target object assigned to the p&o determining means. Or the information-providing means might include a means for transmitting a message containing an identifying name or number of the target object assigned to the p&o determining means via a sound wave or electromagnetic wave which could be received by a device associated with a user.

Function limitation 21.13.13 specifies that the information provided specifies the location of the target object to which the p&o determining means has been assigned. For example, the information specified might be the grid coordinates which reference the target object on a drawing of the assembly of which the target object is a part.

Function limitation 21.13.14 specifies that the information provided specifies the identity of an adapter required to establish the p&o determining means in a fixed position and orientation with respect to the target object to which it has been assigned. For example, the information-providing means might include a means for displaying an identifying name or number of the adapter. Or the information-providing means might include a means for delivering an audio message containing an identifying name or number of the adapter. Or the information-providing means might include a means for transmitting a message containing an identifying name or number of the adapter via a sound wave or electromagnetic wave which can be received by a device associated with a user.

Function limitation 21.13.15 specifies that the information provided includes information for guiding a p&o determining means to a position and to an orientation with respect to its assigned target object, the position being a member of a class of positions and the orientation being a member of a class of orientations. For example, the information might be a reference to a drawing illustrating the p&o determining device in an appropriate position and orientation with respect to its assigned target object.

The third-level delineations of function limitation 21.14 shown in FIG. 15C further define the holding means of function limitation 21.14.

Function limitation 21.14.11 specifies that the holding means causes the p&o determining means to be held in position and orientation, in whole or in part, by forces applied to the p&o determining means, directly or indirectly, by the designated target object.

Function limitation 21.14.21 specifies that the holding means causes the p&o determining means to be held in position and orientation, in whole or in part, by frictional forces applied either to the p&o determining means or to an adapter attached to the p&o determining means.

Function limitation 21.14.31 specifies that the holding means causes the p&o determining means to be held in position and orientation, in whole or in part, by forces exerted by interlocking features of the p&o determining means or an adapter attached to the p&o determining means and the target object.

Function limitation 21.14.41 specifies that the holding means causes the p&o determining means to be held in position and orientation, in whole or in part, by magnetic forces applied either to the p&o determining means or to an adapter attached to the p&o determining means.

Function limitation 21.14.51 specifies that the holding means causes the p&o determining means to be held in position and orientation, in whole or in part, by gravity.

Function limitation 21.14.61 specifies that the holding means causes the p&o determining means to be held in position and orientation, in whole or in part, by human or robotic means. acting either directly or through an adapter attached to the p&o determining means.

The third-level delineations of function limitation 21.15 shown in FIG. 15C further define the information that is the subject matter of function limitation 21.15.

Function limitation 21.15.11 specifies that the information includes that the p&o determining means is presently in the reference position and the reference orientation.

Function limitation 21.15.12 specifies that the information includes the reference position coordinates and the reference orientation coordinates of the p&o determining means. The reference position coordinates and the reference orientation coordinates might be obtained from measurements of acceleration and angular velocity of the p&o determining means when the p&o determining means is in the reference position and the reference orientation. Or the reference position coordinates and/or the reference orientation coordinates of the p&o determining means might be obtained from a memory. Or the reference position coordinates and/or the reference orientation coordinates of the p&o determining means might be obtained from one of the collaborating entities.

Function limitation 21.15.13 specifies that the information includes that the p&o determining means is in a maintained position and a maintained orientation with respect to the target object.

Figure 15D:
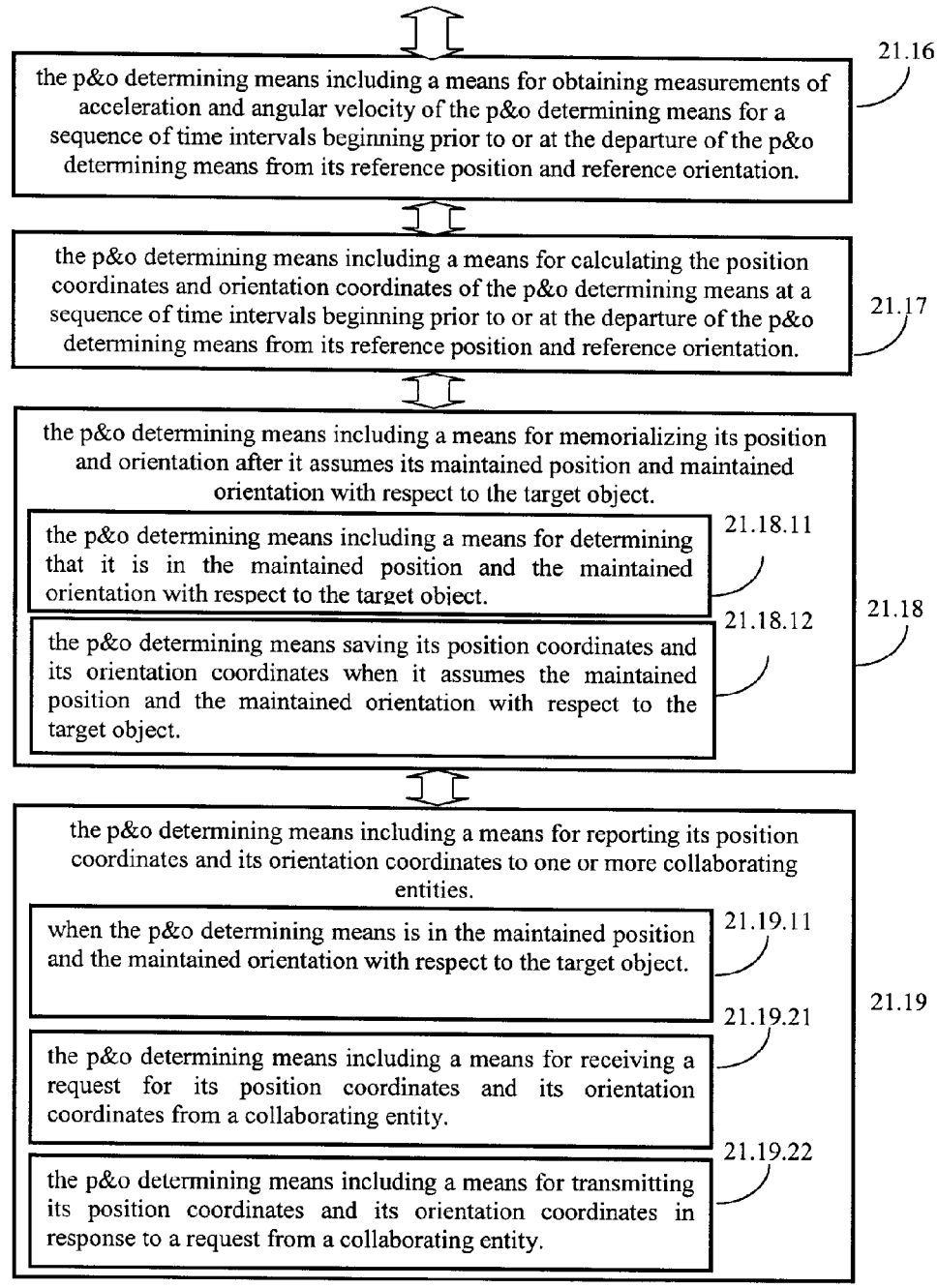

The third-level delineations of function limitation 21.18 shown in FIG. 15D further define the p&o determining means.

Function 21.18.11 specifies that the p&o determining means includes a means for determining that it is in the maintained position and the maintained orientation with respect to the target object.

Function 21.18.12 specifies that the p&o determining means saves its position coordinates and its orientation coordinates when it assumes the maintained position and the maintained orientation with respect to the target object.

The third-level delineations of function limitation 21.19 shown in FIG. 15D further define the p&o determining means.

Function limitation 21.19.11 specifies that the reporting means reports the position coordinates and the orientation coordinates of the p&o determining means when the p&o determining means is in the maintained position and the maintained orientation with respect to the target object.

Function limitation 21.19 21 specifies that the p&o determining means includes a means for receiving a request for its position coordinates and its orientation coordinates from a collaborating entity.

Function limitation 21.19.22 specifies that the p&o determining means includes a means for transmitting its position coordinates and its orientation coordinates in response to a request from a collaborating entity.

Figure 16B:
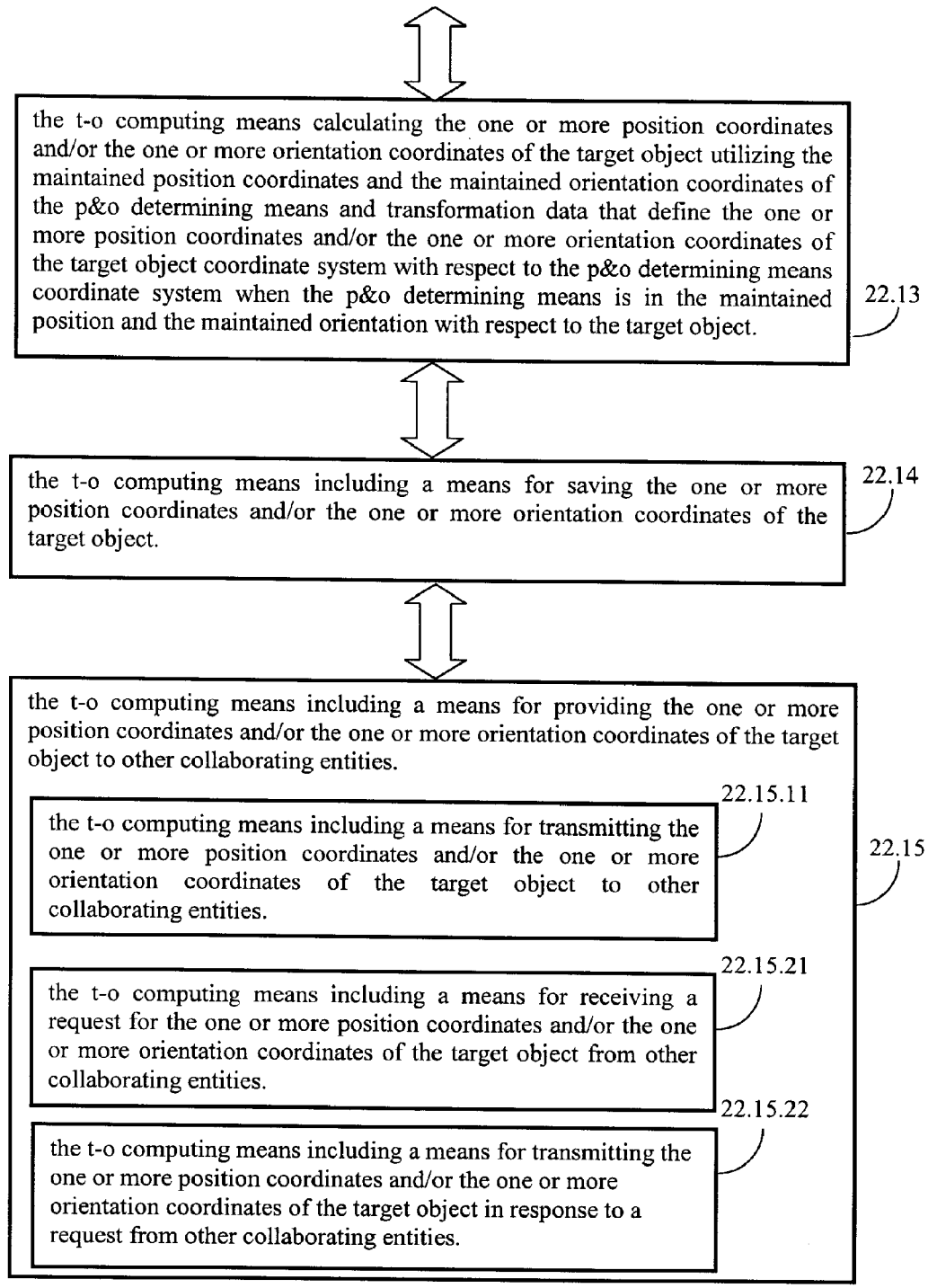
FIG. 16 shows the second and third delineations of means-plus-function 22.

The second- and third-level delineations of t-o computing means 22 are shown in FIGS. 16A and 16B.

Function limitation 22.11 results in the t-o computing means including a means for obtaining the position coordinates and the orientation coordinates of the p&o determining means.

Function limitation 22.12 results in the t-o computing means including a means for obtaining transformation data that define the one or more position coordinates and/or the one or more orientation coordinates of the target object coordinate system with respect to the p&o determining means coordinate system when the p&o determining means is being maintained in a fixed position and orientation with respect to the target object.

Function limitation 22.13 results in the t-o computing means calculating the one or more position coordinates and/or the one or more orientation coordinates of the target object utilizing the maintained position coordinates and the maintained orientation coordinates of the p&o determining means and transformation data that define the one or more position coordinates and/or the one or more orientation coordinates of the target object coordinate system with respect to the p&o determining means coordinate system when the p&o determining means is in the maintained position and the maintained orientation with respect to the target object;

Function limitation 22.14 results in the t-o computing means including a means for saving the one or more position coordinates and/or the one or more orientation coordinates of the target object.

Function limitation 22.15 results in the t-o computing means including a means for providing the one or more position coordinates and/or the one or more orientation coordinates of the target object to other collaborating entities.

The third-level delineations of function limitation 22.11 shown in FIG. 16A further define the t-o computing means of function limitation 22.11.

Function limitation 22.11.11 specifies that the position coordinates and the orientation coordinates of the p&o determining means are obtained when the p&o determining means is in a maintained position and a maintained orientation with respect to the target object.

Function limitation 22.11.21 specifies that the t-o computing means includes a means for requesting the position coordinates and the orientation coordinates of the p&o determining means from a collaborating entity.

Function limitation 22.11.22 specifies that the t-o computing means includes a means for receiving the position coordinates and the orientation coordinates of the p&o determining means in response to a request.

The third-level delineations of function limitation 22.12 shown in FIG. 16A identify possible sources of the transformation data.

Function limitation 22.12.11 specifies that the transformation data is obtained from memory.

Function limitation 22.12.21 specifies that the t-o computing means includes a means for requesting the transformation data from a collaborating entity.

Function limitation 22.12.22 specifies that the t-o computing means includes a means for
receiving the transformation data in response to a request.
The third-level delineations of function limitation 22.15 shown in FIG. 16B further define the t-o computing means.

Function limitation 22.15.11 specifies that the t-o computing means includes a means for transmitting the one or more position coordinates and/or the one or more orientation coordinates of the target object to other collaborating entities.

Figure 17C:
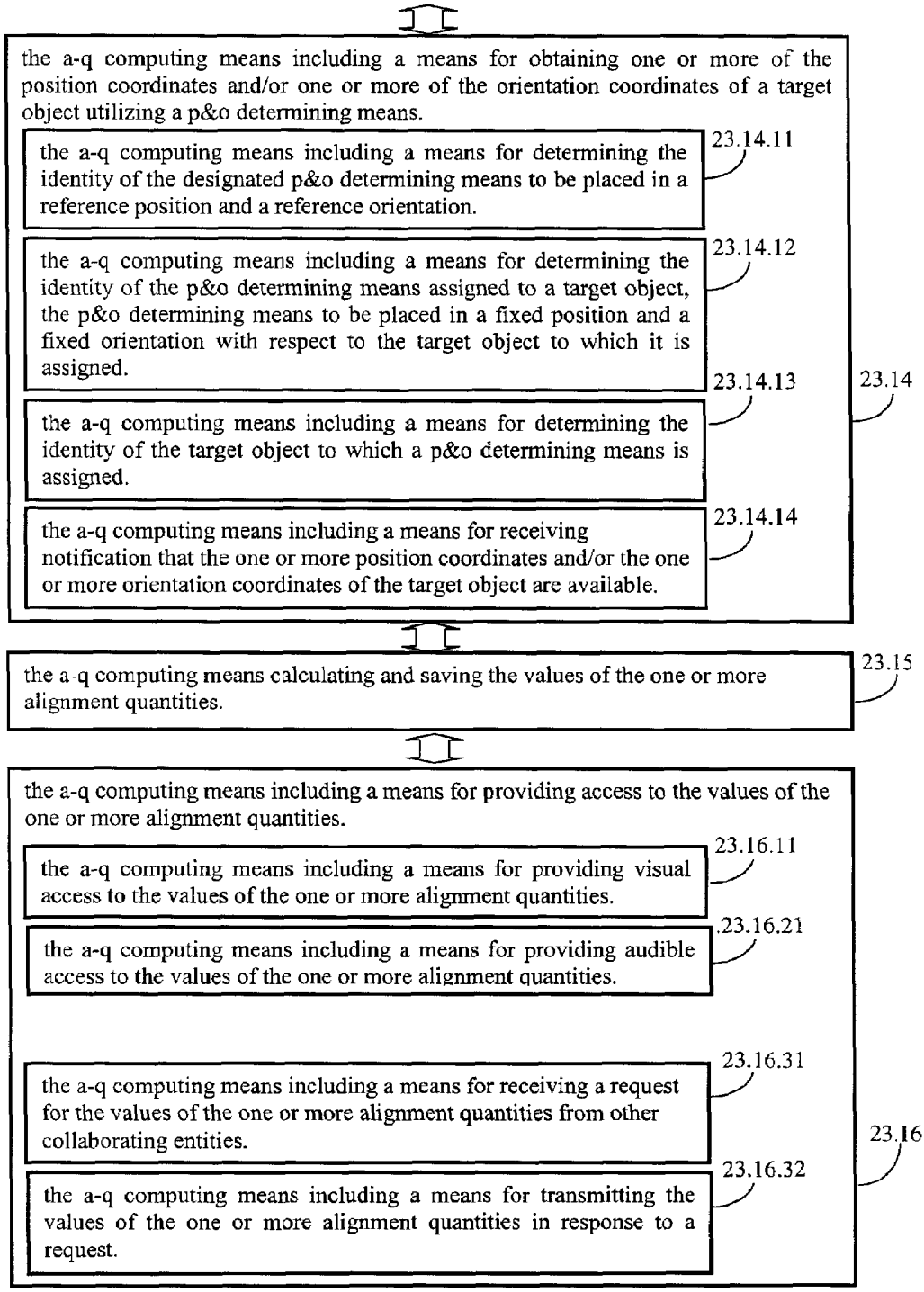
FIG. 17 shows the second and third delineations of means-plus-function 23.

Function limitation 22.15.21 specifies that the t-o computing means including a means for receiving a request for the one or more position coordinates and/or the one or more orientation coordinates of the target object from other collaborating entities;

Function limitation 22.15.22 specifies that the t-o computing means including a means for transmitting the one or more position coordinates and/or the one or more orientation coordinates of the target object in response to a request from other collaborating entities;

The second- and third-level delineations of a-q computing means 23 are shown in FIGS. 17A, 17B, and 17C.

Function limitation 23.11 results in the a-q computing means including a means for obtaining the identities of the one or more alignment quantities for which values are to be determined.

Function limitation 23.12 results in the a-q computing means including a means for obtaining one or more equations which define the values of the one or more alignment quantities in terms of one or more position coordinates and/or one or more orientation coordinates of the one or more target objects.

Function limitation 23.13 results in the a-q computing means including a means for obtaining the identities of the one or more target objects whose one or more position coordinates and/or one or more orientation coordinates are required to determine the values of the one or more alignment quantities.

Function limitation 23.14 results in the a-q computing means including a means for obtaining one or more of the position coordinates and/or one or more of the orientation coordinates of a target object utilizing a p&o determining means.

Function limitation 23.15 results in the a-q computing means calculating and saving the values of the one or more alignment quantities.

Function limitation 23.16 results in the a-q computing means including a means for providing access to the values of the one or more alignment quantities.

The third-level delineations of function limitation 23.11 shown in FIG. 17A further define the a-q computing means of function limitation 23.11.

Function limitation 23.11.11 specifies that the a-q computing means includes a means for requesting the identities of the one or more alignment quantities from a collaborating entity.

Function limitation 23.11.12 specifies that the a-q computing means includes a means for receiving the identities of the one or more alignment quantities in response to a request.

The third-level delineations of function limitation 23.12 shown in FIG. 17A further define the a-q computing means of function limitation 23.12.

Function limitation 23.12.11 specifies that the a-q computing means includes a means for
retrieving one or more of the one or more equations from a memory.

Function limitation 23.12.21 specifies that the a-q computing means includes a means for requesting one or more of the one or more equations.

Function limitation 23.12.22 specifies that the a-q computing means includes a means for receiving one or more of the one or more equations in response to a request.

The third-level delineations of function limitation 23.13 shown in FIG. 17B further define the a-q computing means of function limitation 23.13.

Function limitation 23.13.11 specifies that the a-q computing means includes a means for retrieving the identities of one or more of the one or more target objects from a memory.

Function limitation 23.13.21 specifies that the a-q computing means including a means for requesting the identities of one or more of the one or more target objects from other collaborating entities.

Function limitation 23.13.22 specifies that the a-q computing means includes a means for receiving the identities of one or more of the one or more target objects in response to a request.

Function limitation 23.13.31 specifies that the a-q computing means includes a means for identifying the target objects that are referenced in the one or more equations which define the one or more alignment quantities.

The third-level delineations of function limitation 23.14 shown in FIG. 17C further define the a-q computing means of function limitation 23.14.

Function limitation 23.14.11 specifies that the a-q computing means includes a means for determining the identity of the designated p&o determining means to be placed in a reference position and a reference orientation. For example, the a-q computing means might designate the p&o determining means and include a means for transmitting the identity of the designated p&o determining means to other collaborating entities. Or the a-q computing means might include a means for receiving the identity of the designated p&o determining means from another collaborating entity.

Function limitation 23.14.12 specifies that the a-q computing means includes a means for determining the identity of the p&o determining means assigned to a target object, the p&o determining means to be placed in a fixed position and a fixed orientation with respect to the target object to which it is assigned. For example, the a-q computing means might assign a p&o determining means to a target object and include a means for transmitting the identity of the assigned p&o determining means to other collaborating entities. Or the a-q computing means might include a means for receiving the identity of the assigned p&o determining means from another collaborating entity.

Function limitation 23.14.13 specifies that the a-q computing means includes a means for determining the identity of the target object to which a p&o determining means is assigned. For example, the a-q computing means might assign a target object to a p&o determining means and include a means for transmitting the identity of the assigned target object to other collaborating entities. Or the a-q computing means might include a means for receiving the identity of the assigned target object from another collaborating entity.

Function limitation 23.14.14 specifies that the a-q computing means includes a means for receiving notification that the one or more position coordinates and/or the one or more orientation coordinates of the target object are available. The notification might be accompanied by the one or more position coordinates and/or the one or more orientation coordinates. Or the a-q computing means might include (1) a means for transmitting a request for one or more position coordinates and/or one or more orientation coordinates of the target object to another collaborating entity and (2) a means for receiving one or more position coordinates and/or one or more orientation coordinates of the target object in response to a request.

The third-level delineations of function limitation 23.16 shown in FIG. 17C further define the a-q computing means of function limitation 23.16.

Function limitation 23.16.11 specifies that the a-q computing means includes a means for providing visual access to the values of the one or more alignment quantities.

Function limitation 23.16.21 specifies that the a-q computing means includes a means for providing audible access to the values of the one or more alignment quantities.

Function limitation 23.16.31 specifies that the a-q computing means includes a means for receiving a request for the values of the one or more alignment quantities from other collaborating entities.

Function limitation 23.16.32 specifies that the a-q computing means includes a means for transmitting the values of the one or more alignment quantities in response to a request.

Figure 18:
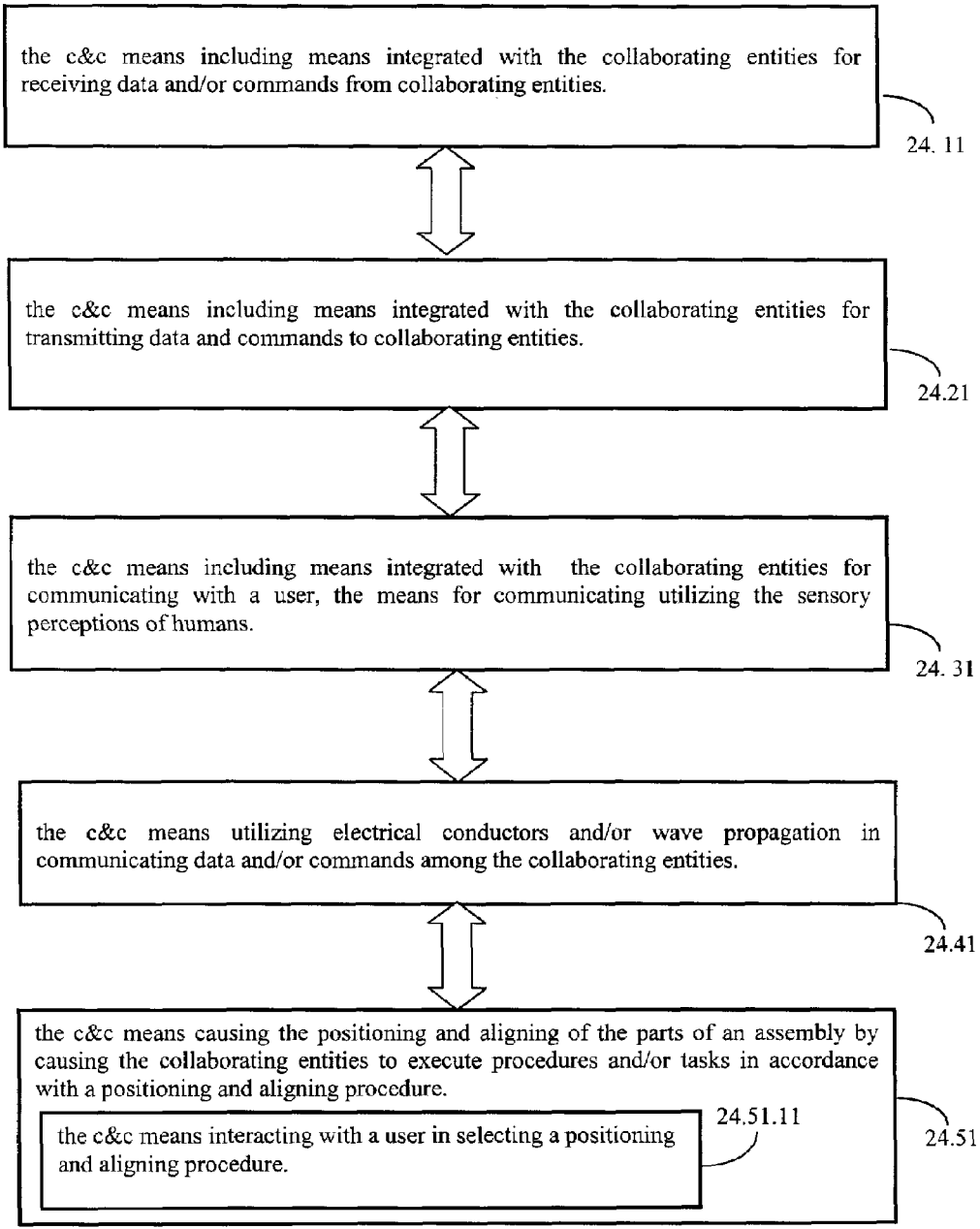
FIG. 18 shows the second and third delineations of means-plus-function 24.

The second-level delineations of c&c means 24 are shown in FIG. 18.

Function limitation 24.11 results in the c&c means including means integrated with the collaborating entities for receiving data and/or commands from collaborating entities.

Function limitation 24.21 results in the c&c means including means integrated with the collaborating entities for transmitting data and commands to collaborating entities.

Function limitation 24.31 results in the c&c means including means integrated with the collaborating entities for communicating with a user, the means for communicating utilizing the sensory perceptions of humans.

Function limitation 24.41 results in the c&c means utilizing electrical conductors and/or wave propagation in communicating data and/or commands among the collaborating entities.

Function limitation 24.51 results in the c&c means causing the positioning and aligning of the parts of an assembly by causing the collaborating entities to execute procedures and/or tasks in accordance with a positioning and aligning procedure.

The third-level delineations of function limitation 24.51 shown in FIG. 18 further defines the c&c means of function limitation 24.51.

Function 24.51.11 specifies that the c&c means interacts with a user in selecting a positioning and aligning procedure.

What is claimed is:

1. A process performed by one or more collaborating entities for obtaining values for one or more alignment quantities using one or more transportable devices, the values for the entirety of alignment quantities being denoted as alignment data, alignment data including the three position coordinate values and the three orientation coordinate values of one or more target objects and data derivable from the position coordinate values and orientation coordinate values of one or more target objects, the term "target object" referring to either an assembly part or any other object involved in obtaining alignment data, each transportable device or target object being associated with an individual coordinate system fixed with respect to the transportable device or target object, the position of a transportable device or target object being defined as the origin of the associated coordinate system, the orientation of a transportable device or a target object being defined as the orientation of the associated coordinate system, positions and orientations being expressed in terms of coordinate values in a common frame of reference, the process comprising:

a step (a) for designating a transportable device and then establishing and maintaining the designated transportable device in a reference position and a reference orientation, the step being executed for each of the one or more transportable devices;

a step (b) for establishing and then maintaining a designated transportable device in one of a class of positions and in one of a class of orientations with respect to a designated target object, the class of positions and the class of orientations each including one or more members, the step being executed for each of the one or more transportable devices with respect to one or more target objects;

a step (c) for determining the maintained position coordinates and the maintained orientation coordinates of a transportable device when the transportable device is being maintained in a fixed position and orientation with respect to a target object from measurements of acceleration and angular velocity of the transportable device as it moves from a reference position to the fixed position and as it rotates from a reference orientation to the fixed orientation, the step being executed for each of one or more transportable devices and with respect to one or more target objects for each transportable device;

a step (d) for determining one or more of the position coordinates and/or one or more of the orientation coordinates of a target object from the maintained position coordinates and the maintained orientation coordinates of a transportable device when the transportable device is in a maintained position and a maintained orientation with respect to the target object, the step being executed for each of one or more transportable devices and with respect to one or more target objects for each transportable device;

a step (e) for determining the values of one or more alignment quantities utilizing one or more position coordinates and/or one or more orientation coordinates of one or more target objects.

2. The process of claim 1 wherein step (a) comprises:
a step for determining the identity of the designated transportable device;
a step for providing information for guiding the designated transportable device to the reference position and the reference orientation;
a step for holding the designated transportable device in the reference position and the reference orientation.

3. The process of claim 1 wherein step (a) comprises:
a step for reporting that the designated transportable device is being maintained in the reference position and the reference orientation.

4. The process of claim 1 wherein step (b) comprises:
a step for determining the identity of the designated transportable device;
a step for determining the identity of the designated target object;
a step for providing information for guiding the designated transportable device to a position and to an orientation with respect to the designated target object, the position being a member of the class of positions, the orientation being a member of the class of orientations;
a step for holding the designated transportable device in one of the class of positions and in one of the class of orientations with respect to the designated target object.

5. The process of claim 1 wherein step (b) comprises:
a step for reporting that the designated transportable device is being maintained in one of a class of positions and in one of a class of orientations with respect to the designated target object.

6. The process of claim 1 wherein step (c) comprises:
a step for receiving a report that the transportable device is in the reference position and the reference orientation;
a step for obtaining the reference position coordinates and the reference orientation coordinates of the transportable device;
a step for obtaining measurements of acceleration and angular velocity of the transportable device for a sequence of time intervals beginning prior to or at the departure of the transportable device from its reference position and reference orientation;
a step for calculating the position coordinates and orientation coordinates of the transportable device at a sequence of time intervals beginning prior to or at the departure of the transportable device from its reference position and reference orientation;
a step for receiving a report that the transportable device is in a maintained position and a maintained orientation with respect to the target object;
a step for saving the maintained position coordinates and the maintained orientation coordinates of the transportable device when the transportable device is in a maintained position and a maintained orientation with respect to the target object.

7. The process of claim 1 wherein step (c) comprises:
a step for reporting the position coordinates and the orientation coordinates of the transportable device.

8. The process of claim 1 wherein step (d) comprises:
a step for obtaining the position coordinates and the orientation coordinates of the transportable device;
a step for obtaining transformation data that define the one or more position coordinates and/or the one or more orientation coordinates of the target object coordinate system with respect to the transportable device coordinate system when the transportable device is being maintained in a fixed position and orientation with respect to the target object;
a step for calculating the one or more position coordinates and/or the one or more orientation coordinates of the target object utilizing the maintained position coordinates and the maintained orientation coordinates of the transportable device and transformation data that define the one or more position coordinates and/or the one or more orientation coordinates of the target object coordinate system with respect to the transportable device coordinate system when the transportable device is in the maintained position and the maintained orientation with respect to the target object;
a step for saving the one or more position coordinates and/or the one or more orientation coordinates of the target object.

9. The process of claim 1 wherein step (d) comprises:
a step for providing access to the one or more position coordinates and/or the one or more orientation coordinates of the target object.

10. The process of claim 1 wherein step (e) comprises:
a step for obtaining the identities of the one or more alignment quantities for which values are to be determined;
a step for obtaining one or more equations which define the values of the one or more alignment quantities in terms of one or more position coordinates and/or one or more orientation coordinates of the one or more target objects;
a step for obtaining the identities of the one or more target objects whose one or more position coordinates and/or one or more orientation coordinates are required to determine the values of the one or more alignment quantities;

a step for obtaining one or more of the position coordinates and/or one or more of the orientation coordinates of a designated target object utilizing a designated transportable device, the step being executed for each of the one or more target objects that are utilized in determining the values of the one or more alignment quantities;

a step for calculating and saving the values of the one or more alignment quantities.

11. The process of claim 1 wherein step (e) comprises:

a step for providing access to the values of the one or more alignment quantities.

12. Apparatus for positioning and aligning parts in an assembly, the apparatus obtaining values of one or more alignment quantities, the values for the entirety of alignment quantities being denoted as alignment data, alignment data including the three position coordinate values and the three orientation coordinate values of one or more target objects and data derivable from the position coordinate values and orientation coordinate values of one or more target objects, the term "target object" referring to either an assembly part or any other object involved in obtaining alignment data, a target object being associated with an individual coordinate system fixed with respect to the target object, the position of a target object being defined as the origin of the associated coordinate system, the orientation of a target object being defined as the orientation of the associated coordinate system, positions and orientations being expressed in terms of coordinate values in a common frame of reference, the apparatus comprising collaborating entities identified below as a p&o determining means, a t-o computing means, an a-q computing means, and a c&c means:

a p&o determining means for determining the values of maintained position coordinates and maintained orientation coordinates of the p&o determining means when the p&o determining means is being maintained in a fixed position and a fixed orientation with respect to a target object, the values of the maintained position coordinates and the maintained orientation coordinates being determined from measurements of acceleration and angular velocity by the p&o determining means as it moves from a reference position to the fixed position and as it rotates from a reference orientation to the fixed orientation, the fixed position being one of a class of positions and the fixed orientation being one of a class of orientations fixed with respect to a target object, the p&o determining means being associated with an individual coordinate system fixed with respect to the p&o determining means, the position of the p&o determining means being defined as the origin of the associated coordinate system, the orientation of the p&o determining means being defined as the orientation of the associated coordinate system;

a t-o computing means for computing the values of one or more of the position coordinates and/or one or more of the orientation coordinates of one or more target objects from the maintained position coordinate values and the maintained orientation coordinate values of the p&o determining means with respect to the one or more target objects;

an a-q computing means for determining the values of one or more alignment quantities utilizing one or more position coordinates and/or one or more orientation coordinates of one or more target objects;

a c&c means for exercising overall command and control over the collaborating entities by causing data and/or commands to be communicated among the collaborating entities.

13. The apparatus of claim 12 wherein the p&o determining means comprises:

a means for providing information to a user necessary for establishing a designated p&o determining means in a reference position and a reference orientation for the purpose of calibration;

a means for holding the p&o determining means in a reference position and a reference orientation;

a means for providing information to a user necessary for establishing a p&o determining means in one of a class of positions and in one of a class of orientations with respect to a target object;

a means for holding the p&o determining means in a fixed position and a fixed orientation with respect to a target object;

a means for obtaining information necessary for the determination of the position and orientation of a target object;

a means for obtaining measurements of acceleration and angular velocity of the p&o determining means for a sequence of time intervals beginning prior to or at the departure of the p&o determining means from its reference position and reference orientation;

a means for calculating the position coordinates and orientation coordinates of the transportable device at a sequence of time intervals beginning prior to or at the departure of the p&o determining means from its reference position and reference orientation;

a means for memorializing its position and orientation after it assumes its maintained position and maintained orientation with respect to the target object.

14. The apparatus of claim 12 wherein the p&o determining means comprises:

a means for reporting its position coordinates and its orientation coordinates to one or more collaborating entities.

15. The apparatus of claim 12 wherein the t-o computing means comprises:

a means for obtaining the position coordinates and the orientation coordinates of the p&o determining means;

a means for obtaining transformation data that define the one or more position coordinates and/or the one or more orientation coordinates of the target object coordinate system with respect to the p&o determining means coordinate system when the p&o determining means is being maintained in a fixed position and orientation with respect to the target object;

a means for calculating the one or more position coordinates and/or the one or more orientation coordinates of the target object utilizing the maintained position coordinates and the maintained orientation coordinates of the p&o determining means and transformation data that define the one or more position coordinates and/or the one or more orientation coordinates of the target object coordinate system with respect to the p&o determining means coordinate system when the p&o determining means is in the maintained position and the maintained orientation with respect to the target object;

a means for saving the one or more position coordinates and/or the one or more orientation coordinates of the target object.

16. The apparatus of claim 12 wherein the t-o computing means comprises:

a means for providing the one or more position coordinates and/or the one or more orientation coordinates of the target object to other collaborating entities.

17. The apparatus of claim 12 wherein the a-q computing means comprises:
a means for obtaining the identities of the one or more alignment quantities for which values are to be determined;
a means for obtaining one or more equations which define the values of the one or more alignment quantities in terms of one or more position coordinates and/or one or more orientation coordinates of the one or more target objects;
a means for obtaining the identities of the one or more target objects whose one or more position coordinates and/or one or more orientation coordinates are required to determine the values of the one or more alignment quantities;
a means for obtaining one or more of the position coordinates and/or one or more of the orientation coordinates of a target object utilizing a p&o determining means;
a means for calculating and saving the values of the one or more alignment quantities.

18. The apparatus of claim 12 wherein the a-q computing means comprises:
a means for providing access to the values of the one or more alignment quantities.

19. The apparatus of claim 12 wherein the c&c means comprises:
means integrated with the collaborating entities for receiving data and/or commands from collaborating entities;
means integrated with the collaborating entities for transmitting data and commands to collaborating entities;
means integrated with the collaborating entities for communicating with a user, the means for communicating utilizing the sensory perceptions of humans;
the c&c means utilizing electrical conductors and/or wave propagation in communicating data and/or commands among the collaborating entities.

20. The apparatus of claim 12 wherein the c&c means causes the positioning and aligning of the parts of an assembly by causing the collaborating entities to execute procedures and/or tasks in accordance with a positioning and aligning procedure.

* * * * *